US012474909B2

(12) United States Patent
Landman et al.

(10) Patent No.: US 12,474,909 B2
(45) Date of Patent: Nov. 18, 2025

(54) SOFTWARE RELEASE DISTRIBUTION ACROSS A HIERARCHICAL NETWORK

(71) Applicant: Jfrog Ltd., Netanya (IL)

(72) Inventors: Yoav Landman, Netanya (IL); Noam Shemesh, Netanya (IL)

(73) Assignee: JFrog Ltd., Netanya (IL)

( * ) Notice: Subject to any disclaimer, the term of this patent is extended or adjusted under 35 U.S.C. 154(b) by 0 days.

(21) Appl. No.: 18/759,624

(22) Filed: Jun. 28, 2024

(65) Prior Publication Data

US 2024/0354089 A1    Oct. 24, 2024

Related U.S. Application Data

(63) Continuation of application No. 17/684,758, filed on Mar. 2, 2022, now Pat. No. 12,061,889.

(60) Provisional application No. 63/273,644, filed on Oct. 29, 2021.

(51) Int. Cl.
| | |
|---|---|
| *G06F 8/61* | (2018.01) |
| *G06F 8/65* | (2018.01) |
| *G06F 21/64* | (2013.01) |
| *H04L 67/1087* | (2022.01) |
| *H04L 67/1097* | (2022.01) |

(52) U.S. Cl.
CPC ............ *G06F 8/61* (2013.01); *G06F 8/65* (2013.01); *G06F 21/64* (2013.01); *H04L 67/1089* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,671,282 | A | 9/1997 | Wolff et al. |
| 5,915,238 | A | 6/1999 | Tjaden |
| 5,931,946 | A | 8/1999 | Terada et al. |

(Continued)

FOREIGN PATENT DOCUMENTS

WO    WO-2012153173 A2    11/2012

OTHER PUBLICATIONS

Patent Cooperation Treaty, International Search Report and Written Opinion issued for PCT Application No. PCT/IB2020/056777, dated Oct. 19, 2020, 15 pages.

(Continued)

*Primary Examiner* — Andrew M. Lyons
(74) *Attorney, Agent, or Firm* — Norton Rose Fulbright US LLP

(57) ABSTRACT

The present disclosure provides systems, methods, and computer readable storage devices for software distribution across a hierarchical network. A method includes sending, by a first node device, a registration request message to a second node device of a first distribution group of the hierarchical network. The registration request message indicates a request for the first node device to join the hierarchical network. The method further includes receiving, by the first node device, a registration response message from the second node device. The registration response message indicates an assignment of the first node device to a second distribution group corresponding to a tier that is below a tier that includes the first distribution group. The first node device may be authorized to perform peer-to-peer (P2P) communications to receive at least a portion of one or more files from node devices in the second distribution group or the second node device.

20 Claims, 9 Drawing Sheets

(56) References Cited

U.S. PATENT DOCUMENTS

| | | |
|---|---|---|
| 6,604,236 B1 | 8/2003 | Draper et al. |
| 7,007,042 B2 | 2/2006 | Lubbers et al. |
| 7,403,901 B1 | 7/2008 | Carley et al. |
| 7,464,158 B2 | 12/2008 | Albornoz |
| 7,685,148 B2 | 3/2010 | Engquist et al. |
| 7,814,146 B2 | 10/2010 | Chavez et al. |
| 7,987,368 B2 | 7/2011 | Zhu et al. |
| 8,036,140 B2 | 10/2011 | Rao et al. |
| 8,131,838 B2 | 3/2012 | Bornhoevd et al. |
| 8,196,186 B2 | 6/2012 | Mityagin et al. |
| 8,239,446 B2 | 8/2012 | Navar et al. |
| 8,364,758 B2 | 1/2013 | Hydrie et al. |
| 8,413,198 B2 | 4/2013 | Connor et al. |
| 8,510,571 B1 | 8/2013 | Chang et al. |
| 8,688,803 B2 | 4/2014 | Manion et al. |
| 8,788,830 B2 | 7/2014 | Piersol |
| 9,009,820 B1 | 4/2015 | McDougal et al. |
| 9,053,124 B1 | 6/2015 | Dornquast et al. |
| 9,280,339 B1 | 3/2016 | Prunicki et al. |
| 9,635,107 B2 | 4/2017 | Souza et al. |
| 9,659,155 B2 | 5/2017 | Kosovan |
| 9,819,665 B1 | 11/2017 | Machani |
| 9,842,062 B2 | 12/2017 | Ford et al. |
| 9,946,531 B1 | 4/2018 | Fields et al. |
| 9,959,394 B2 | 5/2018 | Vlot et al. |
| 9,971,594 B2 | 5/2018 | Fox et al. |
| 10,043,026 B1 | 8/2018 | Salour et al. |
| 10,091,215 B1 | 10/2018 | Word |
| 10,339,299 B1 | 7/2019 | Magnuson et al. |
| 10,387,570 B2 | 8/2019 | VanBlon et al. |
| 10,409,838 B1 | 9/2019 | George et al. |
| 10,701,143 B1 | 6/2020 | Jha et al. |
| 10,719,369 B1 | 7/2020 | Aithal et al. |
| 10,754,952 B2 | 8/2020 | Muller et al. |
| 10,785,334 B2 | 9/2020 | Kristiansson et al. |
| 10,812,975 B1 | 10/2020 | Easwar Prasad et al. |
| 10,880,407 B2 | 12/2020 | Reynolds et al. |
| 10,911,337 B1 | 2/2021 | De Kosnik et al. |
| 10,986,387 B1 | 4/2021 | Parulkar et al. |
| 11,048,590 B1 | 6/2021 | Sapuntzakis et al. |
| 11,064,323 B2 | 7/2021 | Esselink et al. |
| 11,249,739 B2 | 2/2022 | Atkinson et al. |
| 11,284,258 B1 | 3/2022 | Wei et al. |
| 2002/0062439 A1 | 5/2002 | Cotugno et al. |
| 2002/0156893 A1 | 10/2002 | Pouyoul et al. |
| 2002/0198920 A1 | 12/2002 | Resnick et al. |
| 2003/0191955 A1 | 10/2003 | Wagner et al. |
| 2003/0220880 A1 | 11/2003 | Lao et al. |
| 2004/0054764 A1 | 3/2004 | Aderton et al. |
| 2004/0064722 A1 | 4/2004 | Neelay et al. |
| 2004/0181561 A1 | 9/2004 | Knox et al. |
| 2004/0250115 A1 | 12/2004 | Gemmel et al. |
| 2005/0071385 A1 | 3/2005 | Rao |
| 2005/0132348 A1 | 6/2005 | Meulemans et al. |
| 2006/0107286 A1 | 5/2006 | Connor et al. |
| 2006/0136547 A1 | 6/2006 | Neuhaus et al. |
| 2006/0195816 A1 | 8/2006 | Grandcolas et al. |
| 2006/0236392 A1 | 10/2006 | Thomas et al. |
| 2006/0259967 A1 | 11/2006 | Thomas et al. |
| 2007/0169199 A1 | 7/2007 | Quinnell et al. |
| 2007/0220575 A1 | 9/2007 | Cooper et al. |
| 2007/0294686 A1 | 12/2007 | Oh |
| 2008/0005113 A1 | 1/2008 | Li |
| 2008/0005120 A1 | 1/2008 | Li |
| 2008/0082648 A1 | 4/2008 | Ahmed et al. |
| 2008/0163374 A1 | 7/2008 | Rogers et al. |
| 2008/0178287 A1 | 7/2008 | Akulavenkatavara et al. |
| 2008/0294860 A1 | 11/2008 | Stakutis et al. |
| 2009/0013317 A1 | 1/2009 | Abfalter et al. |
| 2009/0083812 A1 | 3/2009 | Tang |
| 2009/0119655 A1 | 5/2009 | Quilty |
| 2009/0144340 A1 | 6/2009 | Ferguson et al. |
| 2009/0210697 A1 | 8/2009 | Chen et al. |
| 2009/0290715 A1 | 11/2009 | Mityagin et al. |
| 2009/0313353 A1 | 12/2009 | Lou |
| 2010/0217694 A1 | 8/2010 | Knighton |
| 2010/0223472 A1 | 9/2010 | Alvarsson |
| 2010/0287363 A1 | 11/2010 | Thorsen |
| 2011/0010258 A1 | 1/2011 | Chavez et al. |
| 2011/0010421 A1 | 1/2011 | Chavez et al. |
| 2011/0071841 A1 | 3/2011 | Fomenko et al. |
| 2011/0072075 A1 | 3/2011 | Gautier |
| 2011/0093701 A1 | 4/2011 | Etchegoyen |
| 2011/0107419 A1 | 5/2011 | Vidal et al. |
| 2011/0113012 A1 | 5/2011 | Gruhl et al. |
| 2011/0225311 A1 | 9/2011 | Liu et al. |
| 2011/0307564 A1 | 12/2011 | Luo et al. |
| 2012/0090025 A1 | 4/2012 | Milner et al. |
| 2012/0131566 A1 | 5/2012 | Morgan et al. |
| 2012/0151051 A1 | 6/2012 | Zhang et al. |
| 2012/0151245 A1 | 6/2012 | Chang et al. |
| 2012/0159469 A1 | 6/2012 | Laor |
| 2012/0222112 A1 | 8/2012 | DiFalco et al. |
| 2012/0233134 A1 | 9/2012 | Barton et al. |
| 2012/0240096 A1 | 9/2012 | Sass |
| 2012/0240236 A1 | 9/2012 | Wyatt et al. |
| 2012/0259920 A1 | 10/2012 | Mathieu et al. |
| 2012/0297405 A1 | 11/2012 | Zhang et al. |
| 2013/0073727 A1 | 3/2013 | Souza et al. |
| 2013/0081100 A1 | 3/2013 | Sreehari et al. |
| 2013/0124807 A1 | 5/2013 | Nielsen et al. |
| 2013/0132946 A1 | 5/2013 | Ma |
| 2013/0268927 A1 | 10/2013 | Cochran |
| 2013/0326481 A1 | 12/2013 | Kannan |
| 2013/0326494 A1 | 12/2013 | Nunez |
| 2014/0172972 A1 | 6/2014 | Burba et al. |
| 2014/0173024 A1 | 6/2014 | Burba et al. |
| 2014/0245376 A1 | 8/2014 | Hibbert et al. |
| 2014/0373160 A1 | 12/2014 | Shigemoto et al. |
| 2015/0003296 A1 | 1/2015 | Fan et al. |
| 2015/0088992 A1 | 3/2015 | Ioannidis et al. |
| 2015/0099510 A1 | 4/2015 | Shah et al. |
| 2015/0172352 A1 | 6/2015 | Gopalakrishnan et al. |
| 2015/0180893 A1 | 6/2015 | Im et al. |
| 2015/0268881 A1 | 9/2015 | Nielsen et al. |
| 2015/0301823 A1 | 10/2015 | Hatakeyama |
| 2015/0302037 A1 | 10/2015 | Jackson et al. |
| 2015/0312243 A1 | 10/2015 | Ponsford et al. |
| 2015/0317145 A1 | 11/2015 | Katariya et al. |
| 2015/0341178 A1 | 11/2015 | Tanaka et al. |
| 2015/0341325 A1 | 11/2015 | Al Jabri |
| 2015/0350186 A1 | 12/2015 | Chan et al. |
| 2016/0006837 A1 | 1/2016 | Reynolds et al. |
| 2016/0117235 A1 | 4/2016 | Mishra et al. |
| 2016/0124665 A1 | 5/2016 | Jain et al. |
| 2016/0164900 A1 | 6/2016 | Pericin |
| 2016/0179867 A1 | 6/2016 | Li et al. |
| 2016/0182494 A1 | 6/2016 | Lissounov et al. |
| 2016/0182556 A1 | 6/2016 | Tatourian et al. |
| 2016/0234237 A1 | 8/2016 | Thakar et al. |
| 2016/0266890 A1 | 9/2016 | Aleksandrov et al. |
| 2016/0267101 A1 | 9/2016 | Clissold et al. |
| 2016/0344834 A1 | 11/2016 | Das |
| 2016/0373440 A1 | 12/2016 | Mather et al. |
| 2017/0003951 A1 | 1/2017 | Newell et al. |
| 2017/0034023 A1 | 2/2017 | Nickolov et al. |
| 2017/0060546 A1 | 3/2017 | Prasad et al. |
| 2017/0147338 A1 | 5/2017 | Jackson et al. |
| 2017/0262657 A1 | 9/2017 | Salmon-Legagneur et al. |
| 2017/0264588 A1 | 9/2017 | Hunt et al. |
| 2017/0300309 A1 | 10/2017 | Berger et al. |
| 2017/0357496 A1 | 12/2017 | Smith et al. |
| 2017/0357807 A1 | 12/2017 | Harms et al. |
| 2017/0371499 A1 | 12/2017 | Checkley et al. |
| 2018/0095993 A1 | 4/2018 | Clark |
| 2018/0136923 A1 | 5/2018 | Xiao |
| 2018/0189043 A1 | 7/2018 | Habayeb |
| 2018/0240546 A1 | 8/2018 | Pfeiffer |
| 2018/0260212 A1 | 9/2018 | Wisnovsky |
| 2018/0373517 A1 | 12/2018 | Hu |
| 2019/0014161 A1 | 1/2019 | Doar et al. |
| 2019/0050576 A1 | 2/2019 | Boulton |
| 2019/0080080 A1 | 3/2019 | Ogura et al. |
| 2019/0130114 A1 | 5/2019 | Smith et al. |

(56) References Cited

U.S. PATENT DOCUMENTS

| | | | |
|---|---|---|---|
| 2019/0138287 A1 | 5/2019 | De Capoa et al. |
| 2019/0141163 A1 | 5/2019 | Markham et al. |
| 2019/0155598 A1 | 5/2019 | Bainville et al. |
| 2019/0205121 A1 | 7/2019 | Ericson |
| 2019/0303623 A1 | 10/2019 | Reddy et al. |
| 2019/0305957 A1 | 10/2019 | Reddy et al. |
| 2019/0306173 A1 | 10/2019 | Reddy et al. |
| 2019/0332367 A1 | 10/2019 | Navarrete Michelini et al. |
| 2019/0379723 A1 | 12/2019 | Demasi et al. |
| 2020/0012441 A1 | 1/2020 | Chheda et al. |
| 2020/0026857 A1 | 1/2020 | Muller et al. |
| 2020/0034132 A1 | 1/2020 | U et al. |
| 2020/0076618 A1 | 3/2020 | Driever et al. |
| 2020/0076807 A1 | 3/2020 | Driever et al. |
| 2020/0084202 A1 | 3/2020 | Smith et al. |
| 2020/0162543 A1 | 5/2020 | Mosko et al. |
| 2020/0177397 A1 | 6/2020 | Harrington |
| 2020/0186505 A1 | 6/2020 | Amar et al. |
| 2020/0213144 A1 | 7/2020 | Maloy |
| 2020/0252207 A1 | 8/2020 | Hanel et al. |
| 2020/0351089 A1 | 11/2020 | Wentz |
| 2020/0372183 A1 | 11/2020 | Rangaiah et al. |
| 2020/0409986 A1 | 12/2020 | Soroushian et al. |
| 2020/0412691 A1 | 12/2020 | Shribman et al. |
| 2021/0021428 A1 | 1/2021 | Landman |
| 2021/0111875 A1 | 4/2021 | Le Saint |
| 2021/0218800 A1 | 7/2021 | Landman |
| 2022/0150073 A1 | 5/2022 | Androulaki et al. |
| 2022/0326944 A1 | 10/2022 | Khan et al. |

OTHER PUBLICATIONS

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Patent Cooperation Treaty, International Search Report and Written Opinion issued for PCT Application No. PCT/IB2020/056776, dated Feb. 22, 2021, 10 pages.

Post, H. et al., "Linking Functional Requirements and Software Verification," 2009 17th IEEE International Requirements Engineering Conference, 2009, 8 pages.

Patent Cooperation Treaty, International Search Report and Written Opinion issued for PCT Application No. PCT/IB2021/050134, dated Mar. 4, 2021, 14 pages.

JFrog; "Access Tokens," https://www.jfrog.com/confluence/display/JCR6X/Access+Tokens, Jan. 29, 2020 (Year: 2020), 1 page.

Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.

eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.

Alibaba Cloud; "Behind Alibaba's Double 11 Mysterious "Dragonfly" Technology® C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.

Seneviratne, AIDK; "Enabling an Authentication Mechanism for Docker Remote API," Mar. 2017 (Year: 2017), 70 pages.

IEEE; "FID: A Faster Image Distribution System for Docker Platform," 2017 (Year: 2017), 8 pages.

DragonFly; "What Is DragonFly?" https://web.archive.org/web/20190501065255/https://d7y.io/enus/docs/overview/what_is_dragonfly.html, May 1, 2019 (Year: 2019), 3 pages.

Uber Engineering Blog; "Introducing Kraken, an Open Source Peer-to-Peer Docker Registry," https://eng.uber.com/introducing-kraken/, May 5, 2019 (Year: 2019), 3 pages.

JFrog; "Searching for Artifacts," https://www.jfrog.com/confluence/display/JCR6X/Searching+for+Artifacts, Jan. 29, 2020 (Year: 2020), 3 pages.

Yoshida et al. "Understanding the Origins of Weak Cryptographic Algorithms Used for Signing Android Apps," 2018 $42^{nd}$ IEEE International Conference on Computer Software and Applications; 6 pages.

H. B. Hadj Abdallah and W. Louati, "Ftree-CDN: Hybrid CDN and P2P Architecture for Efficient Content Distribution," 2019 27th Euromicro International Conference on Parallel, Distributed and Network-Based Processing (PDP), Pavia, Italy, 2019, pp. 438-445, doi: 10.1109/EMPDP.2019.8671549. (Year: 2019), 8 pages.

M. Srivatsa, B. Gedik and Ling Liu, "Scaling Unstructured Peer-to-Peer Networks with Multi-Tier Capacity-Aware Overlay Topologies," Proceedings. Tenth International Conference on Parallel and Distributed Systems, 2004. ICPADS 2004., Newport Beach, CA, USA, 2004, pp. 17-24. (Year: 2004), 8 pages.

F. Turkmen, P. Mazzoleni, B. Crispo and E. Bertino, "P-CDN: Extending Access Control Capabilities of P2P Systems to Provide CDN Services," 2008 IEEE Symposium on Computers and Communications, Marrakech, Morocco, 2008, pp. 480-486, doi: 10.1109/ISCC.2008.4625671. (Year: 2008), 7 pages.

SOFTWARE RELEASE DISTRIBUTION ACROSS A HIERARCHICAL NETWORK

CROSS-REFERENCE TO RELATED APPLICATIONS

The present application is a continuation of U.S. patent application Ser. No. 17/684,758 entitled "SOFTWARE RELEASE DISTRIBUTION ACROSS A HIERARCHICAL NETWORK," which claims the benefit of U.S. Provisional Patent Application No. 63/273,644, filed Oct. 29, 2021 entitled "SOFTWARE RELEASE DISTRIBUTION ACROSS A HIERARCHICAL NETWORK", and is related to co-pending U.S. patent application Ser. No. 16/399,905 entitled "DATA BUNDLE GENERATION AND DEPLOYMENT," filed Apr. 30, 2019; to co-pending U.S. patent application Ser. No. 16/399,938 entitled "DATA FILE PARTITION AND REPLICATION," filed Apr. 30, 2019; and to co-pending U.S. patent application Ser. No. 16/399,953 entitled "DATA FILE PARTITION AND REPLICATION" filed Apr. 30, 2019, the disclosures of which are incorporated by reference herein in their entirety.

TECHNICAL FIELD

The present application is generally related to the technical field of software distribution, and more particularly, but not by way of limitation, to software release distribution across a hierarchical network and/or for Internet-of-Things (IoT) deployment.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. To update a piece of software, a new version is developed and deployed to a device, such as a software consumable device that stores and executes the new version of the software.

To deploy file or software, a memory device including the new version of the software can be physically connected and uploaded to a target device. Deploying a file or software in such a manner can be time consuming, resource (e.g., personnel) intensive, and is impractical for software to be deployed to multiple locations or for service-oriented architecture that may require multiple updates for different pieces of software at different times or for a service in which software is deployed many times per day or hour. Alternatively, a file or software can be deployed via one or more networks. As an example, software may be deployed to multiple client devices via a content distribution network (CDN), also known as a content delivery network. A CDN typically includes multiple servers, often located at different geographic locations, that provide data (e.g., content) to geographically distributed client devices. One goal of a CDN is to provide high availability of the content and improved performance (e.g., download speeds) by distributing the service spatially relative to the client devices.

Deployment of a file or software via a CDN presents its own challenges. For example, a device (e.g., a client device) to receive the file or the software needs to be connected to the CDN and maintain a sufficient network connection to receive the entire version of the file or the software. As another example, the CDN itself must have sufficient bandwidth and acceptable latencies to enable the file or the software to be deployed. Because CDNs are based on a fixed topology, if one of the servers that is responsible for distributing content to client devices (or other servers) has a poor network connection or goes offline, the server may become a bottleneck or a point of failure for the CDN, which may create network flooding, require one or more retries (and thus delays), or even prevent at least some devices from receiving the file or software. Additionally, the file or the software typically needs to be deployed in a secure manner so that unauthorized updates and/or deployments are avoided. In some circumstances, deployment of files or software may also need to be accessible to an endpoint device and require authorization. Additionally, software may be designed with certain permissions and settings to be enforced by the receiving devices, which may be difficult if the receiving devices execute different operating systems and/or software in addition to the deployed software.

As an alternative to providing the file or the software from a server, a peer-to-peer (P2P) protocol may be used to provide the file or software to the multiple devices. However, use of a P2P protocol includes its own challenges. For example, P2P protocols may have difficulty controlling bandwidth between peer devices, can lack secure communication, and can lack authentication and authorization prior to download. As another example, P2P protocols may rely on P2P metadata exchange to identify devices with or without the file or software, which can be a time consuming process to identify a device with the file or software. Thus, deploying a file or software efficiently, consistently, and securely has many difficult challenges when deployed by a CDN or using a P2P protocol.

BRIEF SUMMARY

Aspects of the present disclosure provide systems, methods, and computer-readable storage media that support software distribution across a hierarchical network that leverages peer-to-peer (P2P) downloading between at least some nodes (e.g., devices). Such a network may be referred to as a "Private Distribution Network" (PDN) (e.g., a hybrid content distribution network (CDN) and peer-to-peer (P2P) network managed by or for an enterprise) that achieves numerous benefits as compared to a CDN or a P2P network. For example, a tracker device (e.g., an edge device, a distribution device, a server, etc.) may both distribute one or more files to other devices and play an active role in managing P2P transfers of the one or more files. To illustrate, the tracker device may provide portion(s) of a file (or multiple files), such as part of a software release or software release update, to one or more distribution groups. Each distribution group may include one or more node devices that are configured, using a lightweight node device application, to perform P2P file transfers with other members of the same distribution group and with other devices to which the distribution group acts as a parent group in a hierarchical network. The other devices may include node devices of one or more distribution groups within a lower level of the hierarchical network. Node devices of a distribution group may receive one or more portions of a file (or multiple files) from the tracker device and perform P2P communications with other devices within the same distribution group to distribute the portions of the file to quickly distribute an entirety of the file throughout the distribution group. After or during distribution of the file among the distribution group, the node devices of the distribution group may distribute the file, or portions thereof, to devices below the distribution group in the hierarchical network. Additionally, the tracker device may establish and maintain a topology of the hierarchical network, such as assignment of devices to groups and/or tiers of the hierarchical network, in addition to determining or tracking an availability of one or more portions of the file at devices within the hierarchical network. In some such implementations, the tracker device may issue at least one node device a signed certificate and/or token to enable authorized and/or trusted P2P communication between two or more peer devices (e.g., node devices within the same or different distribution groups). The signed certificate or token may be used to enable encryption of P2P (e.g., inter-peer) communications, such as communications encrypted with Transport Layer Security (TLS), as a non-limiting example.

To coordinate file transfer (e.g., file downloading) between devices of the hierarchical network and to maintain the network topology, a device seeking to join the hierarchical network as an additional node device (e.g., a new node device) may send a registration request to an upstream node device or a root node (e.g., the tracker device) to which the additional node device is establishing a connection. The upstream node device, which is part of an upstream distribution group, may forward the registration request to a higher tier of the hierarchical network (e.g., a different upstream distribution group or the tracker device), and in this manner the registration request is forwarded by one or more devices to the tracker device. The registration request may include identification information corresponding to the additional node device, to the upstream node device to which the additional node device is connecting, other information, or a combination thereof. Based on the registration request, the tracker device may validate an identity of the additional node device (or a user thereof) and determine whether to allow the additional node device to join the hierarchical network. If the additional node device is approved to join the hierarchical network, the tracker device may generate and/or send a registration response to a neighboring distribution group to be forwarded (e.g., by the neighboring distribution group or via multiple distribution groups of multiple tiers of the hierarchical network) downstream to the additional node device. In some implementations, the registration response may include one or more group keys, which may enable encryption and decryption of messages within the hierarchical network by the additional node device. Additionally, the tracker device may update topology information to indicate assignment of the additional node device to a distribution group, linking of the additional node device to the upstream node device, assignment of the additional node device to a particular tier of the hierarchical network, other topology information corresponding to the additional node device, or a combination thereof.

When one or more files, including but not limited to a software release or software release update, are to be deployed, the additional node device may send a download approval request to an upstream node device, and the download approval request may be forwarded to the tracker device. The download approval request may correspond to at least part of one or more files, such as at least a portion of a binary. Based on the download approval request, the tracker device may determine whether the additional node device is permitted access to the files. For example, the tracker device may check one or more permissions or licenses corresponding to the additional node device to confirm that the additional node device is authorized to receive the portion of the file. Based on successful authorization of the additional node device, the tracker device may generate and/or send download information to a downstream distribution group to be forwarded (e.g., by the downstream distribution group or via multiple downstream distribution groups of multiple tiers of the hierarchical network) to the additional node device. In some implementations, the download information may include metadata, such as a checksum for each portion of multiple portions of a file and a checksum for the file. Additionally or alternatively, based on the download approval request and successful authorization of the additional node device, the tracker device may generate and/or send an authorization indicator, such as a token, to the additional node device via one or more intermediate distribution groups. The authorization indicator may indicate a time period, such as a renewable time period, during which the additional node device may engage in P2P communication(s) with peer devices (e.g., in the same or upstream distribution groups) to receive at least the portion of the file. In implementations where the authorization indicator is renewable, the authorization indicator may be renewable by the tracker device such that the tracker device controls and/or has an opportunity to control or stop a P2P download process initiated by the additional node device. Although described as two separate requests, in some implementations, the registration request process and the download approval request process may be combined in a single registration process that causes the tracker device to provide the registration response, the group key(s), the download information, and the authorization indicator (e.g., the token) to the additional node device. Additionally, although described as the additional node device requesting the one or more files (e.g., a pull operation), in other implementations, the one or more files may be distributed throughout the hierarchical network in a top-down manner (e.g., a push operation), such as via a proactive push distribution of a software release.

In some implementations, the download information provided to the additional node device may include an indication of devices available and/or permitted for peer sharing. For example, the download information may include or indicate other members of the distribution group to which the additional node device is assigned, other members of a parent group to which the upstream node device is assigned, or a combination thereof, from which the additional node device may receive at least the portion of the file. In some implementations, the download information may include a portion of the topology information and information indicating which devices store which portions of the file (or the software release). In some implementations, the download information may include one or more bitmaps that indicate portions of the file, portions of the software release, etc., that each peer device (e.g., of the same or parent distribution group) stores or does not store, or which peer devices store a particular portion of the file, a particular file, or an entirety of the software release.

The additional node device (e.g., the requesting client device) may establish communication with one or more peer devices, such as one or more upstream node devices, one or more other node devices within the same distribution group as the additional node device, or a combination thereof, and the additional node device may request at least the portion of the file from the one or more peer devices. In some implementations, the additional node device may establish a connection with the peer devices using Hypertext Transfer Protocol Secure (HTTP/S) or HTTP 2.0. The additional node device may request the portion of the file based on the download information. In some implementations, the additional node device may prioritize which portion of the file (or the software release) to obtain from another device. For example, the additional node device may prioritize a portion based on its availability (e.g., its rarity) among other devices, which may then increase the availability for other devices once the additional node device receives that portion. As another example, the additional node device may prioritize a portion that is sequentially earlier than other portions so that the additional node device can begin streaming the file as the portions are received. To illustrate, the additional node device may divide a file into a plurality of portions and use a window, such as a sliding window, to enable the additional node device to support streaming of the file as the additional node device receives the portions. In some implementations, the additional node device may receive one or more portions of a file in parallel from multiple other devices. The additional node device may report the received portions as the portions are received to upstream node devices, which may forward the reports to the tracker device. Additionally or alternatively, the additional node device may periodically report received or missing portions, or the additional node device may wait until after successfully receiving an entirety of the file (or the software release) to report to the upstream node devices. Based on receiving a portion of the file, the additional node device may confirm that the received portion is correct to avoid consuming or distributing bad or corrupted file portions. Additionally or alternatively, after the additional node device receives multiple portions of the file, the additional node device may confirm that it has received an entirety of the file (or the software release). The tracker device may receive the reports or confirmations and update the topology information, or other file distribution information, to indicate which portion(s) of the file (or the software release) are successfully stored at the additional node device, and optionally available for download by peer devices of the additional node device. In some implementations, the file and/or the software release may be included with or correspond to a particular executable file package, such as Docker as a non-limiting example, and the software release distribution process may be package-aware such that permissions, settings, and other such features at different node devices (or eventually at client devices/endpoint devices) may be controlled by the tracker device or a software developer. In some implementations, the above-described process may be streamlined due to pre-authorization of the additional node device, lack of needing to execute the software release at the additional node device, or the like.

According to one aspect, a method for managing software distribution across a hierarchical network includes assigning, by a device corresponding to a top tier of the hierarchical network, a first plurality of node devices to a first set of one or more distribution groups corresponding to a first tier of the hierarchical network that is below the top tier. Each of the first plurality of node devices assigned to one of the first set of distribution groups. The method further includes assigning, by the device, a second plurality of node devices to a second set of one or more distribution groups corresponding to a second tier of the hierarchical network that is below the first tier, each of the second plurality of node devices assigned to one of the second set of distribution groups. A first distribution group of the first set of distribution groups is configured as a parent group of the second set of distribution groups. The method further includes maintaining, by the device, topology information indicating assignments of node devices to groups within the hierarchical network. The method further includes sending, by the device, one or more files to the first set of distribution groups for at least partial peer-to-peer (P2P) distribution within the first set of distribution groups.

According to another aspect, a system for managing software distribution across a hierarchical network includes at least one memory storing instructions and one or more processors coupled to the at least one memory. The one or more processors are configured to execute the instructions to cause the one or more processors to assign a first plurality of node devices to a first set of one or more distribution groups corresponding to a first tier of the hierarchical network that is below a top tier. Each of the first plurality of node devices is assigned to one of the first set of distribution groups. The one or more processors are further configured to execute the instructions to cause the one or more processors to assign a second plurality of node devices to a second set of one or more distribution groups corresponding to a second tier of the hierarchical network that is below the first tier. Each of the second plurality of node devices is assigned to one of the second set of distribution groups, and a first distribution group of the first set of distribution groups is configured as a parent group of the second set of distribution groups. The one or more processors are further configured to execute the instructions to cause the one or more processors to maintain topology information indicating assignments of node devices to groups within the hierarchical network. The one or more processors are further configured to execute the instructions to cause the one or more processors to send one or more files to the first set of distribution groups for at least partial peer-to-peer (P2P) distribution within the first set of distribution groups.

According to another aspect, a method for managing software distribution across a hierarchical network includes sending, by a first node device, a registration request message to a second node device of a first distribution group of the hierarchical network. The registration request message indicates a request for the first node device to join the hierarchical network. The method further includes receiving, by the first node device, a registration response message from the second node device. The registration response message indicates an assignment of the first node device to a second distribution group corresponding to a lower tier of the hierarchical network that is below a tier that includes the first distribution group. The registration response message further indicates node devices included in the first distribution group, node devices included in the second distribution group, or both. The method further includes receiving, by the first node device, a token from the second node device, the token corresponding to authorization for the first node device to perform peer-to-peer (P2P) communications with the node devices of the second distribution group to retrieve at least a portion of one or more files. The method further includes sending, by the first node device, a download request message corresponding to the one or more files to the second node device, one or more other node devices of the second distribution group, or a combination thereof. The download request message includes the token.

According to another aspect, a system for managing software distribution across a hierarchical network includes at least one memory storing instructions and one or more processors coupled to the at least one memory. The one or more processors are configured to execute the instructions to cause the one or more processors to send a registration request message to a node device of a first distribution group of the hierarchical network. The registration request message indicates a request to join the hierarchical network. The one or more processors are further configured to execute the instructions to cause the one or more processors to receive a registration response message from the second node device. The registration response message indicates an assignment to a second distribution group corresponding to a lower tier of the hierarchical network that is below a tier that includes the first distribution group. The registration response message further indicates node devices included in the first distribution group, node devices included in the second distribution group, or both. The one or more processors are further configured to execute the instructions to cause the one or more processors to receive a token from the second node device, the token corresponding to authorization to perform peer-to-peer (P2P) communications with the node devices of the second distribution group to retrieve at least a portion of one or more files. The one or more processors are further configured to execute the instructions to cause the one or more processors to send a download request message corresponding to the one or more files to the second node device, one or more other node devices of the second distribution group, or a combination thereof. The download request message includes the token.

Aspects of the present disclosure provide benefits compared to conventional CDNs or P2P networks for software release deployment and distribution. For example, the hierarchical network described herein (e.g., the PDN) enables a software deployment server (e.g., an Artifactory server) or other tracker device to maintain a flexible network topology that can be dynamically configured based on available devices within the network, instead of being configured based on a static, fixed topology like a CDN. Additionally, the server or tracker device is able to check permissions and authorizations of devices prior to allowing the devices to join the hierarchical network or download the software release, providing improved security and varying permissions to be applied to different distribution groups (which may correspond to different regions, serve different types of client or endpoint devices, or the like), as compared to a typical P2P network, while experiencing the increased download speed, reduced network congestion, and reduced bottlenecks/failure points, as compared to a typical CDN. The systems and techniques of the present disclosure provide an ultra-scalable, highly-available, permission-aware, and container and package-aware hierarchical network that works over a wireless access network (WAN). Each node device runs a lightweight application and has a low storage caching proxy, thereby requiring fewer processing resources and a smaller memory footprint than servers or node devices of a typical CDN. Additionally, the highest tier of the hierarchical network (e.g., the tracker device) provides security and authorization and activity auditing capabilities not available in a typical P2P network. Accordingly, an enterprise can use lower complexity and lower cost hardware to set up and manage a fast, secure, massively scalable PDN for software updates, or such a PDN may be offered by a third-party using on-premises equipment or cloud-based services, thereby significantly accelerating software distribution to speed up deployments and concurrent downloads across large-scale environments spanning hybrid infrastructure, edges, and Internet of Things (IoT) devices.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which.

Figure 1:
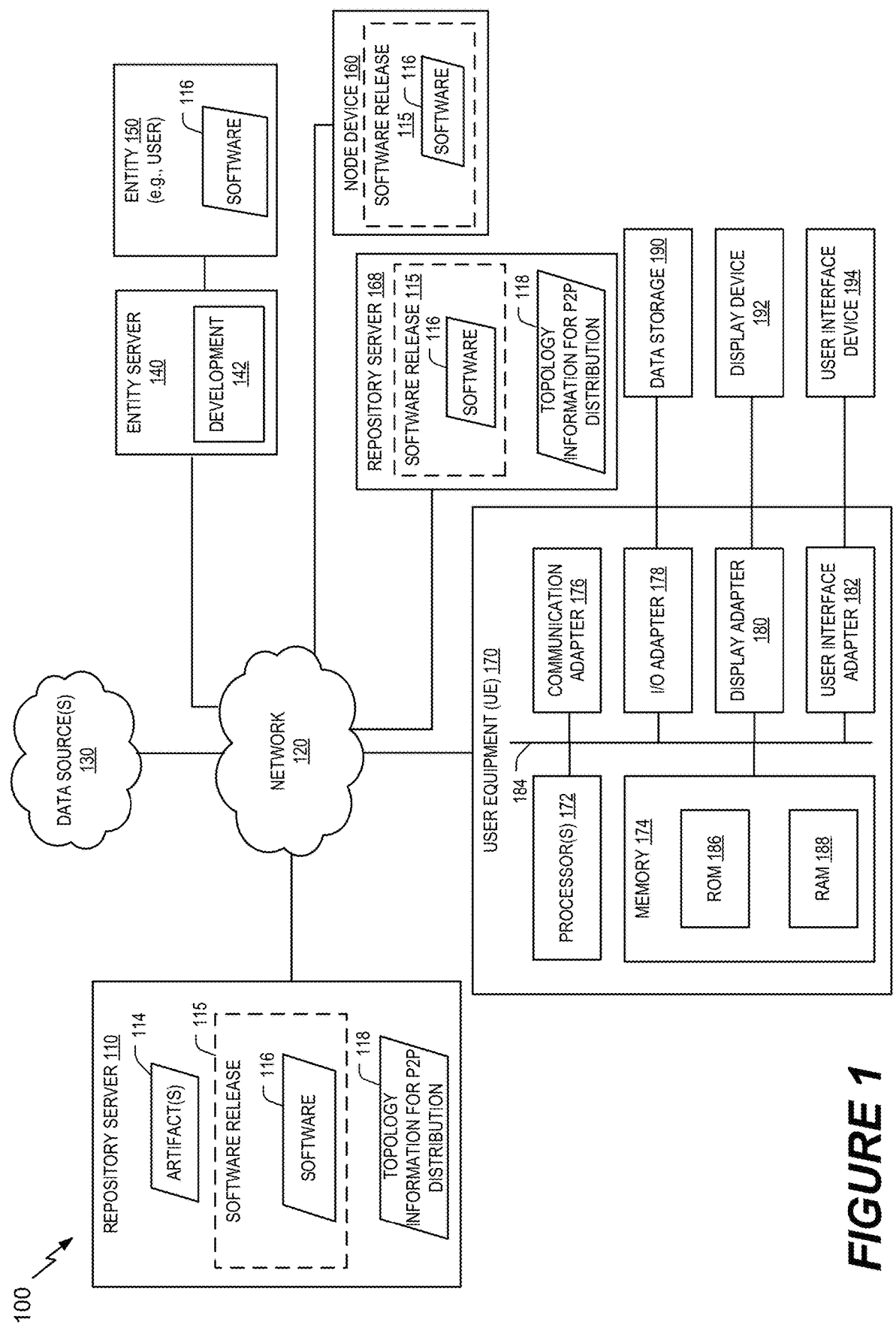
FIG. 1 is a block diagram of an example of a system that includes a server for software distribution across a hierarchical network.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

DETAILED DESCRIPTION

Inventive concepts described herein describe a hierarchical network that leverages peer-to-peer (P2P) downloading to support managed, secured, and coordinated deployment of software while avoiding drawbacks of a centralized network deployment, such as a conventional content distribution network (CDN), and the lack of security and control of a conventional P2P network. Such a hierarchical network (e.g., a "Private Distribution Network" (PDN)) includes a tracker device (e.g., an edge device, a distribution device, a server, etc.) that may both distribute a software release (e.g., one or more files, release bundle data, etc.) to other devices and play an active role in managing P2P transfers of the software release. To illustrate, the tracker device may provide portion(s) of a software release or software update, such as portion(s) of one or more files, or any set of one or more files, to one or more downstream distribution groups (e.g., groups of node devices that are lower than the tracker device in the hierarchal network). Each distribution group may include one or more node devices that are configured, using a lightweight node device application, to perform P2P file transfers with other members of the same distribution group and/or upstream devices to cause each member of the distribution group to receive and store an entirety of the software release. After receiving the software release, the members of the distribution group act as distributors of the software release (or portions thereof) to one or more downstream distribution groups (e.g., groups of node devices that are on a lower tier of the hierarchical network). File downloads between members of each distribution group are performed using P2P communications, and file downloads between distribution groups of different tiers may be performed using P2P downloads or via direct downloads similar to in a typical CDN. Additionally, the tracker device may establish and maintain a topology of the hierarchical network, such as assignment of devices to groups and/or tiers of the hierarchical network, in addition to determining or tracking an availability of one or more portions of the software release at devices within the hierarchical network. In some such implementations, to provide security and permissioned access to the software release, the tracker device may authorize devices before the devices are allowed to join the hierarchical network and may issue at least one node device a signed certificate or token to enable authorized and/or trusted P2P communication between two or more peer devices (e.g., node devices within the same distribution group or within hierarchically linked distribution groups).

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for software distribution across a hierarchical network according to one or more aspects is shown and designated 100. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to some implementations, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2-6. One of skill in the art will readily recognize that different server and computer architectures can be utilized to implement server 110, and that server 110 is not limited to a particular architecture so long as the hardware implementing server 110 supports the functions of the system disclosed herein. In some implementations, server 110 is maintained by an enterprise that generates and deploys software to multiple devices, and server 110 may be located on premises of the enterprise, or server 110 may be a remote server such within a private or public cloud. As shown in FIG. 1, user equipment can be used to enable an owner and/or administrator of server 110 to access and modify aspects (e.g., instructions, applications, data) of server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of server 110, entity server 140, entity 150, node device 160, and/or server 168.

As shown, server 110 includes one or more artifacts 114 and software release 115. Artifacts 114 may include one or more binaries (e.g., any computer files) and, optionally, related metadata. The artifacts may correspond to one or more package types. For example, a first artifact may correspond to a first package type, such as Maven, and a second artifact may correspond to a second package type, such as Bower. Software release 115 may include software 116 (e.g., one or more of artifacts 114) and may be associated with topology information 118 for distribution of software release 115 throughout a hierarchical network. As described further herein, topology information 118 may indicate or represent the topology of a hierarchical network (also referred to as a private distribution network (PDN)) for use in distribution of software releases, such as software release 115. Although described in the context of distributing software release 115 in FIGS. 1-2, any one or more files or one or more of artifacts 114 may be distributed in a similar manner, without requiring such files or artifacts to be bundled together as a software release.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity server 140 may support a development process 142 that includes multiple development stages for generating software for a software release. In such implementations, entity 150 includes or is configured to generate (or initiate generation of) software 116 (e.g., one or more files). Software 116 includes one or more files (e.g., binaries) to be included in a software release. For example, software 116 may correspond to a build job generated by a continuous integration/continuous delivery (CI/CD) pipeline. In some implementations, after performance of development process 142, entity 150 provides software 116, or software information indicating the files included in software 116, to server 110. In other implementations, entity 150 provides a query and/or one or more parameters for a query which is performed by server 110 to generate the software information at server 110. To illustrate, entity 150 may initiate a query by server 110 to identify one or more files corresponding to a particular build job identifier. The software information may be used to generate a software release, as further described herein.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes software 116. Software (e.g., packages) hosted at node device 160 may be part of a software release which is a secure and immutable collection of software packages that make up a software release. For example, node device 160 may receive software release 115, including software 116, as part of a distribution of software release 115 via a hierarchical network (e.g., a PDN), as further described herein.

In some implementations, node device 160 may include or correspond to entity 150. Although system 100 is shown as having one node device 160, in other implementations, the system 100 may include multiple node devices (e.g., 160). Node device 160 may include a data center, a point-of-sale device, a mobile device, or an Internet of things (IoT) device. In some implementations, node device 160 includes a communications device, a fixed location data unit, a mobile location data unit, a mobile phone, a cellular phone, a satellite phone, a computer, a server, a tablet, a portable computer, a wearable device, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, an augmented reality (AR) device, a virtual reality (VR) device, an extended reality (XR) device, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, node device 160 may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts 114. In some implementations, server 168 receives software release 115 (e.g., software 116) and topology information 118 and supplies software release 115 to node device 160.

With respect to user equipment 170, user equipment 170 may include one or more processors 172, memory 174, a communication adapter 176, an input/output (I/O) adapter 178, a display adapter 180, a user interface adapter 182, and a bus 184. As shown, each of one or more processors 172, such as a central processing unit (CPU), memory 174, communication adapter 176, I/O adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of one or more processors 172 so long as one or more processors 172, whether directly or indirectly, support the operations described herein. One or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some aspects, server 110 may be accessed via an online portal. I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain aspects, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, wearable devices, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, smartphone, wearable device, or other similar end user computing device. Users can interact with server 110 (and/or server 168) using a device via one or more networks, such as network 120, which itself can comprise one or more of a local intranet, a Local Area Network (LAN), a Wide Area Network (WAN), a virtual private network (VPN), and the like. As will be apparent to those of skill in the art, communicative coupling between different devices of system 100 can be provided by, e.g., one or more of wireless connections, a synchronous optical network (SONET) connection, a digital TI, TN, E1 or E3 line, Digital Data Service (DDS) connection, DSL (Digital Subscriber Line) connection, an Ethernet connection, and the like.

Figure 2:
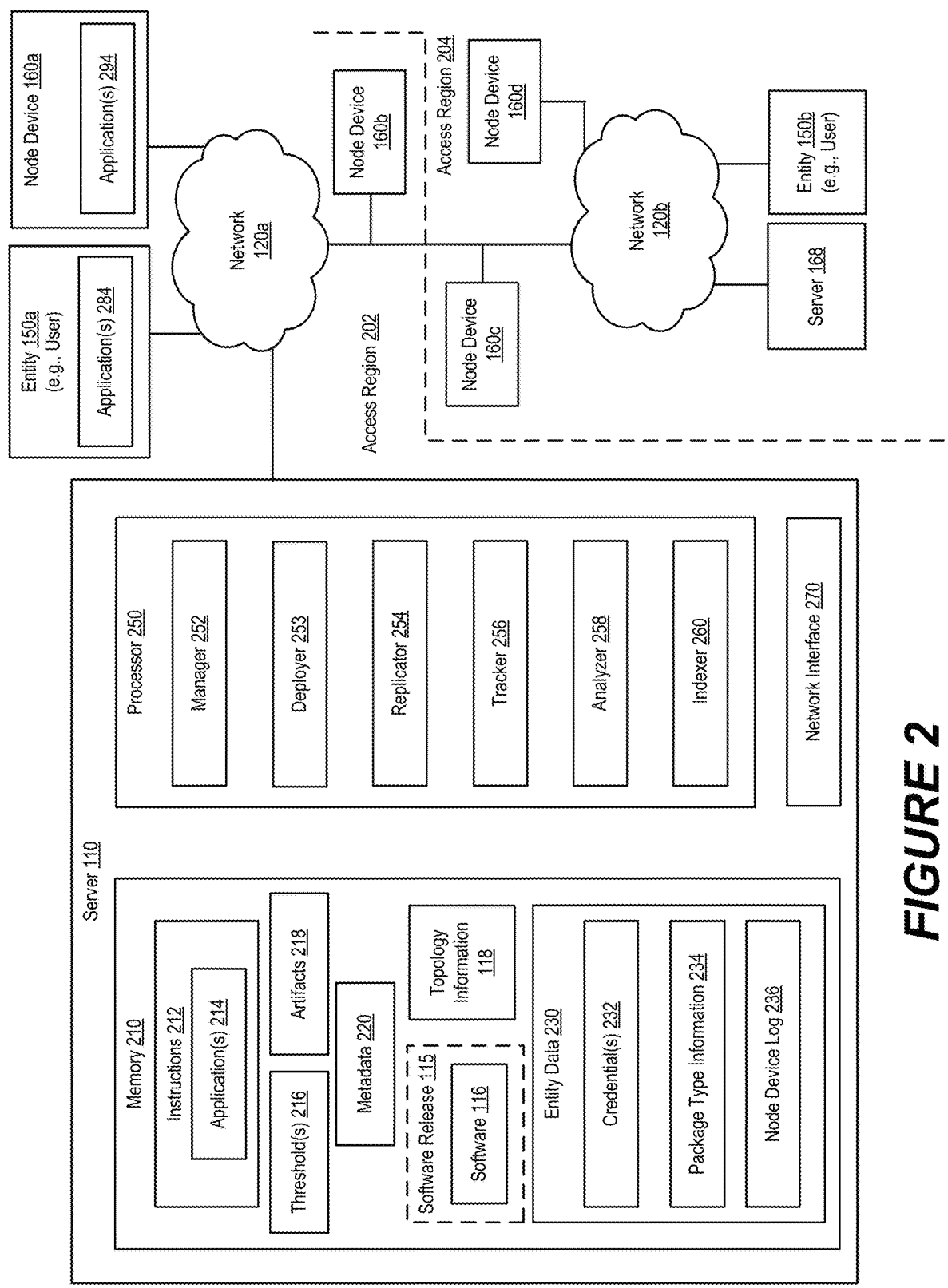
FIG. 2 is a block diagram of another example of a system for software distribution across a hierarchical network.

Referring to FIG. 2, a block diagram of a system for software distribution across a hierarchical network according to one or more aspects is shown as a system 200. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan), as a non-limiting example.

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120 of FIG. 1. Each of the entities 150a, 150b may include or correspond to entity 150 of FIG. 1. In some implementations, a first entity 150a and a second entity 150b may be part of the same group, company, etc., or may be part of different groups, companies, etc. Each of node devices 160a, 160b, 160c, 160d may include or correspond to node device 160 of FIG. 1. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), metadata 220, software release 115, and entity data 230. For example, memory 210 may store instructions 212, that when executed by one or more processors 250, cause the processor 250 to perform functions, methods, processes, and/or operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by one or more processors 250. In some such implementations, one or more of the memories may be external to server 110. To illustrate, at least one memory may include or correspond to a database accessible to server 110, such as a database that stores one or more thresholds 216, artifacts 218, metadata 220, software release 115, topology information 118, entity data 230, or any combination thereof. In some implementations, memory 210 may include or be coupled to cloud storage such that one or more thresholds 216, one or more of artifacts 218, metadata 220, software release 115, and/or entity data 230 is stored at a cloud storage location and accessible by server 110.

Thresholds 216 may include or correspond to one or more thresholds, such as a time period threshold, a size threshold, etc. Artifacts 218 may include or correspond to artifacts 114 of FIG. 1. Metadata 220 may include metadata for artifacts 218 or artifacts 114, metadata for application 214, metadata for one or more files (e.g., 116), metadata for validation information, or any combination thereof. Metadata for an artifact (e.g., 114 or 218) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples.

Software release 115 includes software 116 and software release information. Software release information includes information corresponding to software 116, such as one or more checksums, metadata, or a combination thereof. Software 116 may include one or more files (e.g., one or more of artifacts 218), and may correspond to a build job. Software 116 may be designated for distribution to entity devices (e.g., node devices, client devices, root devices, etc.) as part of software release 115.

Entity data 230 may include data associated with one or more entities. For example, entity data 230 may include or correspond to one or more of entity 150a, 150b. Entity data 230 may include one or more credentials 232, package type information 234, and a node device log 236. Credentials 232 include login information to enable one or more users and/or one or more entities to access server 110. Additionally, or alternatively, credentials 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a list of target nodes at which one or more security objects are to be synchronized or software release 115 is to be deployed.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions described herein. As shown in FIG. 2, in some implementations, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In some implementations, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or more of artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., processor 172 of FIG. 1 or processor 250) to enable a user (e.g., 150a) to manage one or more other components/modules (e.g., 253, 254, 256, 258, 260) of processor 250, as described herein.

Deployer 253 may be configured to perform or manage one or more aspects of a software release distribution. For example, deployer 253 provides a secure and structured platform to distribute and release binaries as a single coherent release bundle to multiple remote locations and update them as new release versions are produced. Such release bundles may also be distributed throughout hierarchical networks by tracker 256, as further described herein. A release bundle may include one or more files and/or release bundle information which includes or indicates a list of the one or more files (e.g., artifacts) to be included in the release bundle and metadata (e.g., properties) associated with the release bundle. For example, software release 115 may include software 116 (e.g., one or more files) and software release information which includes metadata corresponding to software 116. The release bundle information may include, for each file of the bundle release, a checksum (of the file), metadata (corresponding to the file), or both. In some implementations, the release bundle also includes additional metadata (e.g., file name, file size, path to the file, etc.) corresponding to the release bundle, such as a release bundle name, a version number, a source identifier, description information, release data, and/or a size. Additionally, or alternatively, the software release information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more node devices (e.g., 160a, 160b, 160c, 160d). In some implementations, as part of the release flow, release bundles are verified and validated by the source and/or destination to ensure that they are signed correctly and safe to use. In some implementations, deployer 253 includes a deployer module that includes one or more routines, executable by one or more processors (e.g., the processor 172 of FIG. 1 or processor 250) to perform a software release distribution.

Replicator 254 may be configured to coordinate and provide one or more artifacts (e.g., one or more files) and/or metadata between two or more devices. For example, replicator 254 may coordinate transfer of one or more artifacts (e.g., one or more files) and/or metadata between server 110 and server 168, between server 110 and one or more of node devices 160*a*, 160*b*, 160*c*, 160*d*, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160*a*, 160*b*, 160*c*, 160*d*). Additionally, or alternatively, replicator 254 may be configured to identify a difference between at least one file stored at a first device (e.g., server 110) and one or more files stored at a second device (e.g., server 168 or one of node devices 160*a*, 160*b*, 160*c*, 160*d*), and initiate transfer of at least one or more portions of a file to the second device. In some implementations, replicator 254 includes a replicator module that includes one or more routines, executable by one or more processors (e.g., the processor 172 of FIG. 1 or processor 250) to coordinate and provide one or more artifacts (e.g., one or more files) and/or metadata between two or more devices.

Tracker 256 may be configured to track one or more artifacts, metadata, one or more release bundles, or any combination thereof deployed or attempted to be deployed to a node device, such as one or more of node devices 160*a*, 160*b*, 160*c*, 160*d*, a server (e.g., server 110, 168), or both. Additionally or alternatively, tracker 256 may be configured to manage, populate, track, and otherwise control distribution of files and/or software releases throughout hierarchical networks (e.g., PDNs). In some such implementations, operations performed by tracker 256 include registering node devices to join a hierarchical network and maintaining a topology of the hierarchical network, as further described herein. In some implementations, tracker 256 includes a tracker module that includes one or more routines, executable by one or more processors (e.g., the processor 172 of FIG. 1 or processor 250) to manage, populate, track, and otherwise control distribution of one or more artifacts, metadata, one or more release bundles, or any combination thereof deployed or attempted to be deployed to a node device, such as one or more of node devices 160*a*, 160*b*, 160*c*, 160*d*, and/or one or more servers (e.g., server 110, 168), via a hierarchical network (e.g., a PDN).

Analyzer 258 may be configured to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1 or processor 250) to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate metadata (e.g., 220), such as metadata defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1 or processor 250) to provide an indexing capability, including maintaining interdependencies and information, for one or more package types.

In some implementations, one or more of modules 252-260 may be optional. For example, in some implementations in which server 110 is configured to distribute software releases but not otherwise manage artifacts or files, processor 250 may include deployer 253 and manager 252. In some other implementations, processor 250 may include multiple or all of modules 252-260, and server 110 may be configured to deploy software releases in addition to operate as a universal artifact repository.

Figure 3:
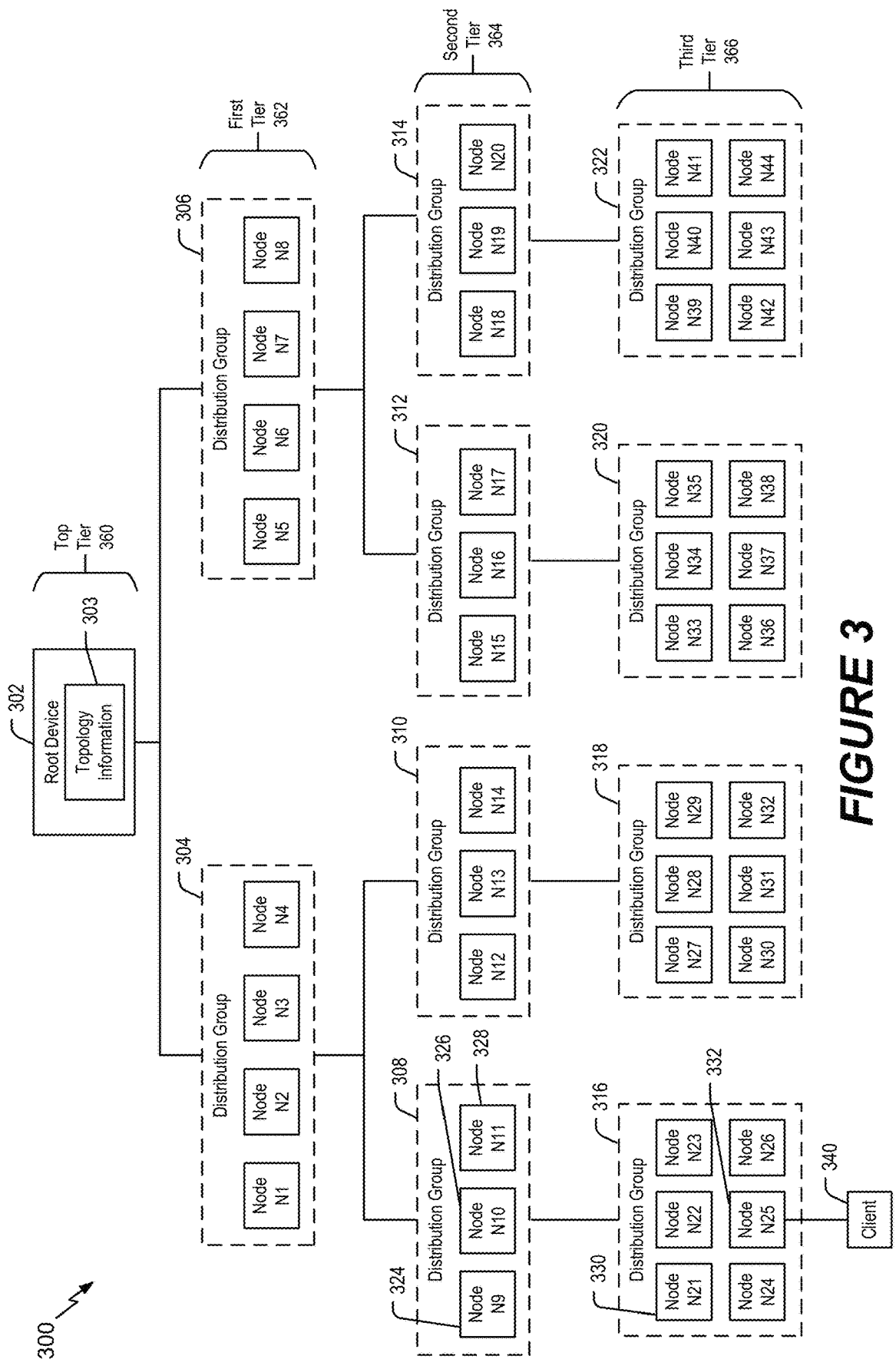
FIG. 3 is a block diagram of another example of a system for software distribution across a hierarchical network.

Referring to FIG. 3, a block diagram of a system for software distribution across a hierarchical network according to one or more aspects is shown and designated 300. The hierarchical network may include a private network (also referred to as a private distribution network (PDN)) of an enterprise, as an illustrative example. System 300 includes root device 302 (e.g., a server, an edge device, or a tracker), distribution groups 304, 306, 308, 310, 312, 314, 316, 318, 320, and 322, and one or more client devices, such as illustrative client device 340. In some other examples, system 300 may include a different number of root devices (such as more than one root device in a high availability mode), distribution groups, and/or client devices than illustrated in the example of FIG. 3.

Each distribution group 304, 306, 308, 310, 312, 314, 316, 318, 320, and 322 may include multiple node devices. To illustrate, distribution group 304 may include node devices N1, N2, N3, and N4 ("N1-N4"), distribution group 306 may include node devices N5, N6, N7, and N8 ("N5-N8"), and distribution group 308 may include node devices 324, 326, and 328 (also referred to herein as node devices N9, N10, and N11 ("N9-N11")). As additional examples, distribution group 310 may include node devices N12, N13, and N14 ("N12-N14"), distribution group 312 may include node devices N15, N16, and N17 ("N15-N17"), and distribution group 314 may include node devices N18, N19, and N20 ("N18-N20"). As still further examples, distribution group 316 may include node devices N21, N22, N23, N24, N25, and N26 ("N22-N26"), distribution group 318 may include node devices N27, N28, N29, N30, N31, and N32 ("N27-N32"), distribution group 320 may include node devices N33, N34, N35, N36, N37, and N38 ("N33-N38"), and distribution group 322 may include node devices N39, N40, N41, N42, N43, and N44 ("N39-N44"). In some other examples, one or more of distribution groups 304, 306, 308, 310, 312, 314, 316, 318, 320, and 322 may include a different number of node devices than illustrated in the example of FIG. 3. As non-limiting examples, node devices may include servers, desktop computers, portable computers, edge devices, or other devices that include a processor and a memory and have a network connection capable to supporting file sharing to one or more other devices. In some implementations, the node devices are set up and deployed by an enterprise that generates the software release or files for distribution, such as using on premises devices or networked or cloud devices of the enterprise. In some other implementations, the node devices may be set up and deployed by a third party that provides software repository and distribution services, such as at one or more on premises devices of the third party or one or more cloud devices provisioned by the third party.

One or more client devices may be communicatively coupled to any of the node devices N1-N44 in order to retrieve software releases or other files or artifacts stored at the respective node devices. For example, client device 340 may be communicatively coupled to one or more node devices of distribution group 316, such as in the example shown in FIG. 3 in which client device 340 is communicatively coupled to node device 332 (also referred to herein as node device N25) and not to node device 330 (also referred to herein as node device N21). Although a single client device is shown in FIG. 3, in other implementations, one or more client devices may be communicatively coupled to any or all of the node devices of distribution group 316, or any other distribution group, and/or client device 340 may be communicatively coupled to more than one node device of distribution group 316. The client devices may be set up and deployed by an enterprise that generates the software release or files for distribution. As non-limiting examples, client devices such as client device 340 may include portable computers, mobile devices, wearable devices, vehicles (or components thereof), media playback devices, entertainment devices, sensors, smart home devices, IoT devices, or other devices. The client devices may be low-complexity devices and may be configured to only receive and execute files but not to share files with other devices, or the client devices may not have permissions to share the files with other client devices, instead the other client devices receive the files from one or more node devices. As a non-limiting example, client device 340 may be configured to pull Docker images from one or more nodes of distribution group 316.

System 300 may include or correspond to at least a portion of system 100 and/or system 200. For example, in some implementations, root device 302 may correspond to repository server 110 or repository server 168. As another example, one or more node devices illustrated in FIG. 3 may correspond to node device 160, 160a, 160b, 160c, or 160d described with reference to FIGS. 1 and 2. As an additional example, devices illustrated in FIG. 3 may be coupled via one or more networks, such as networks 120, 120a, or 120b described with reference to FIGS. 1 and 2.

In some implementations, system 300 includes or corresponds to a hierarchical network (e.g., a PDN) having multiple tiers. For example, the hierarchical network may include top tier 360 that includes root device 302. The hierarchical network may further include first tier 362 that is below top tier 360, second tier 364 that is below first tier 362, and third tier 366 that is below second tier 364. Distribution groups 304 and 306 may correspond to or may be included in first tier 362, distribution groups 308, 310, 312, and 314 may correspond to or may be included in second tier 364, and distribution groups 316, 318, 320, and 322 may correspond to or may be included in third tier 366. The particular example depicted in FIG. 3 is for illustration and is not limiting. In other implementations, the hierarchical network may include fewer than three or more than three tiers, and the tiers may include different numbers of distribution groups and node devices than shown in FIG. 3.

During operation of system 300, root device 302 may assign node devices to distribution groups, to tiers of the hierarchical network, or both. To illustrate, in some examples, distribution groups 304, 306 may correspond to first geographic regions of a first size, distribution groups 308, 310, 312, and 314 may each correspond to second geographic regions of second size (less than the first size) within one of the first geographic regions, and distribution groups 316, 318, 320, and 322 may each correspond to third geographic regions of third size (less than the second size) within one of the second geographic regions. As an illustrative example, distribution group 304 may correspond to a first country, province, or continent, distribution groups 308, 310 may correspond to different cities, states, or municipalities within the first country, province, or continent, and distribution groups 316, 318 may correspond to different locations of an enterprise (e.g., offices, factories, etc.) within the cities, states, or municipalities. Distribution group 306 may correspond to a second country, province or continent (that is different than the first country, province or continent), distribution groups 312, 314 may correspond to different cities, states, or municipalities within the second country, province, or continent, and distribution groups 320, 322 may correspond to different locations of an enterprise within the cities, states, or municipalities. As a non-limiting illustrative example, distribution groups 304, 306 may respectively correspond to the United States (US) and Europe, distribution groups 308, 310, 312, and 314 may respectively correspond to Miami, Seattle, Amsterdam, and Dublin, and distribution groups 316, 318, 320, and 322 may correspond to a factory in Miami, a factory in Seattle, an office in Amsterdam, and a worksite in Dublin. In such examples, node devices N1-N4 may be geographically located in the US, node devices N5-N8 may be geographically located in Europe, and node devices N9-N11, N12-N14, N15-N17, and N18-N20 may be geographically located in Miami, Seattle, Amsterdam, and Dublin, respectively. Further, in such examples, distribution groups 316, 318, 320, and 322, and the node devices thereof, may be geographically located in Miami, Seattle, Amsterdam, and Dublin, respectively. Other examples are also within the scope of the disclosure.

A distribution group included in a higher tier of the hierarchical network may serve as or correspond to a parent group of a distribution group or client device group included in a lower tier of the hierarchical network, also referred to as a child group. For example, distribution group 304 may correspond to a parent group of distribution groups 308, 310, and distribution group 306 may correspond to a parent group of distribution groups 312, 314. As additional examples, distribution groups 308, 310, 312, and 314 may correspond to parent groups of distribution groups 316, 318, 320, and 322, respectively.

Root device 302 may maintain topology information 303 (e.g., topology information 118) indicating assignments of node devices of system 300 to groups within the hierarchical network, to tiers of the hierarchical network, or both. As an example, in response to assigning node device N1 to distribution group 304 (e.g., based on a geographic location of node device N1), root device 302 may store an indication to, or may update, topology information 303 to indicate that node device N1 is associated with distribution group 304 and first tier 362. As another example, in response to assigning node device N17 to distribution group 312 (e.g., based on a geographic location of node device N17), root device 302 may store an indication to, or may update, topology information 303 to indicate that node device N17 is associated with distribution group 312 and second tier 364. Additionally or alternatively, root device 302 may maintain distribution information (e.g., as part of topology information 303 or as separate distribution list(s)) that includes a list of the files distributed to the hierarchical network and the portion(s) of each file stored at the node devices within the hierarchical network.

Devices of system 300 may perform or facilitate software release distribution and/or file downloading across the hierarchical network. For example, software release distribution may be performed using peer-to-peer (P2P) distribution using distribution groups, as described further with reference to FIG. 4. The P2P distribution may be controlled or otherwise managed by root device 302 (or another device in a higher tier), such that the distribution is a hybrid top-down and P2P methodologies, as further described herein. Additionally or alternatively, node devices may join the hierarchical network and download one or more files from node devices of a parent distribution group or from peer devices within the same distribution group, and the registration and capability of node devices to download the files may be managed by root device 302 (or another device in a higher tier).

Figure 4:
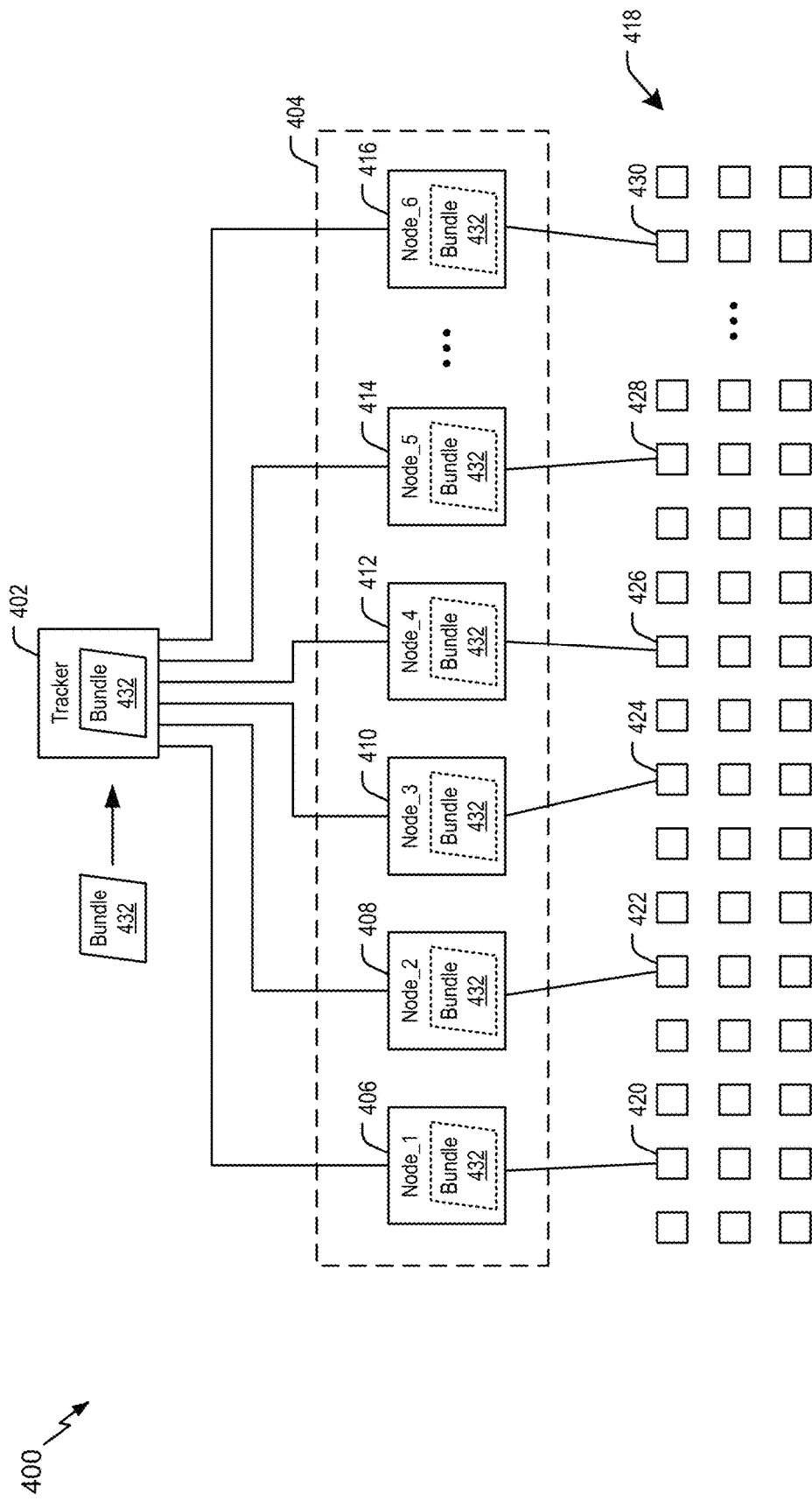
FIG. 4 is a block diagram of another example of a system for software distribution across a hierarchical network.

Referring to FIG. 4, a block diagram of a system for software distribution across a hierarchical network according to one or more aspects is shown and designated 400. The hierarchical network described with reference to FIG. 4 may include or correspond to the hierarchical network described with reference to FIG. 3 and may include any of tiers 360, 362, 364, and 366.

System 400 includes tracker 402, distribution group 404, and client devices 418. System 400 may include or correspond to at least a portion of any of systems 100, 200, or 300. For example, in some implementations, tracker 402 includes or corresponds to root device 302. As additional examples, distribution group 404 may correspond to any distribution group of FIG. 3, and client devices 418 may include client device 340 of FIG. 3.

Distribution group 404 may include node devices, such as node device 406 ("node_1"), node device 408 ("node_2"), node device 410 ("node_3"), node device 412 ("node_4"), node device 414 ("node_5"), and node device 416 ("node_6"). Client devices 418 may include client devices that are each in communication with one or more node devices of distribution group 404. To illustrate, client devices 420, 422, 424, 426, 428, and 430 may be in communication with node devices 406, 408, 410, 412, 414, and 416, respectively.

During operation, tracker 402 may receive a bundle 432 for distribution to distribution group 404. Bundle 432 may include or correspond to software release 115. For example, bundle 432 may include software (e.g., one or more artifacts or files) and release information such as metadata associated with individual files and/or the software release as a whole, checksums associated with individual files and/or the software release as a whole, other information, or a combination thereof. Tracker 402 may send bundle 432 to one or more distribution groups for P2P distribution within the one or more distribution groups. For example, tracker 402 may send bundle 432 to at least one node device of distribution group 404 for P2P distribution to other node devices within distribution group 404. In some implementations, tracker 402 may provide a different respective portion (or "chunk") of bundle 432 to one or more of node devices 406, 408, 410, 412, 414, and 416, and node devices 406, 408, 410, 412, 414, and 416 may perform P2P communication with one another to exchange the portions so that each node device 406, 408, 410, 412, 414, and 416 stores an entirety of bundle 432. Receipt of bundle 432 may be conditioned upon registration with tracker 402, assignment to a group of the hierarchical network, and presentation of a token and/or other credentials to a device providing bundle 432 (or any portion thereof), as further described herein. Alternatively, instead of tracker 402 pushing bundle 432 to node devices of distribution group 404, node devices may download one or more files (e.g., bundle 432 or other files) from tracker 402, such as based on downloading schedules, requests for files from connected client devices, or the like. For example, tracker 402 may make one or more files available for download to distribution groups, and node devices of distribution group 404 may download portions of the files from tracker 402 or from other node devices (e.g., peer devices) within distribution group 404. As an illustrative example, tracker 402 may perform P2P communications with one or more node devices of distribution group 404 to provide the files (or portions thereof) to the one or more node devices. As node devices are added to distribution group 404, the newly added node devices may similarly download files, such as bundle 432 or other files, from tracker 402, from peer devices within distribution group 404, or both. Upon successful download of the files, the node devices may provide confirmation to tracker 402 so that tracker 402 may update a distribution list to indicate storage of the files at the node devices. Accordingly, aspects of the present disclosure support both pushing and pulling of files and/or software releases to node devices of hierarchical networks (e.g., PDNs).

Node devices 406, 408, 410, 412, 414, and 416 may distribute bundle 432 to client devices 418. For example, node devices 406, 408, 410, 412, 414, and 416 may push bundle 432 to client devices 420, 422, 424, 426, 428, and 430, respectively. After downloading bundle 432, client devices 420, 422, 424, 426, 428, and 430 may execute one or more files of bundle 432 to perform a software update indicated by bundle 432. Alternatively, instead of node devices pushing bundle 432 to client devices, client devices may request files from node devices, such as based on user commands at the client devices, scheduled downloading at the client devices, or the like. In such implementations, node devices may make stored files available for download to connected client devices, such as client device 420 downloading one or more files from node device 406 as a non-limiting example. Validation and security of client device file transfers may be managed by the node devices performing the file transfers, and not by the hierarchical network (e.g., by tracker 402). For example, client devices may use credentials associated with the node devices, or with a higher-level device, such as a universal artifact repository that oversees or manages the hierarchical network, to be validated and receive files from node devices.

Figure 5:
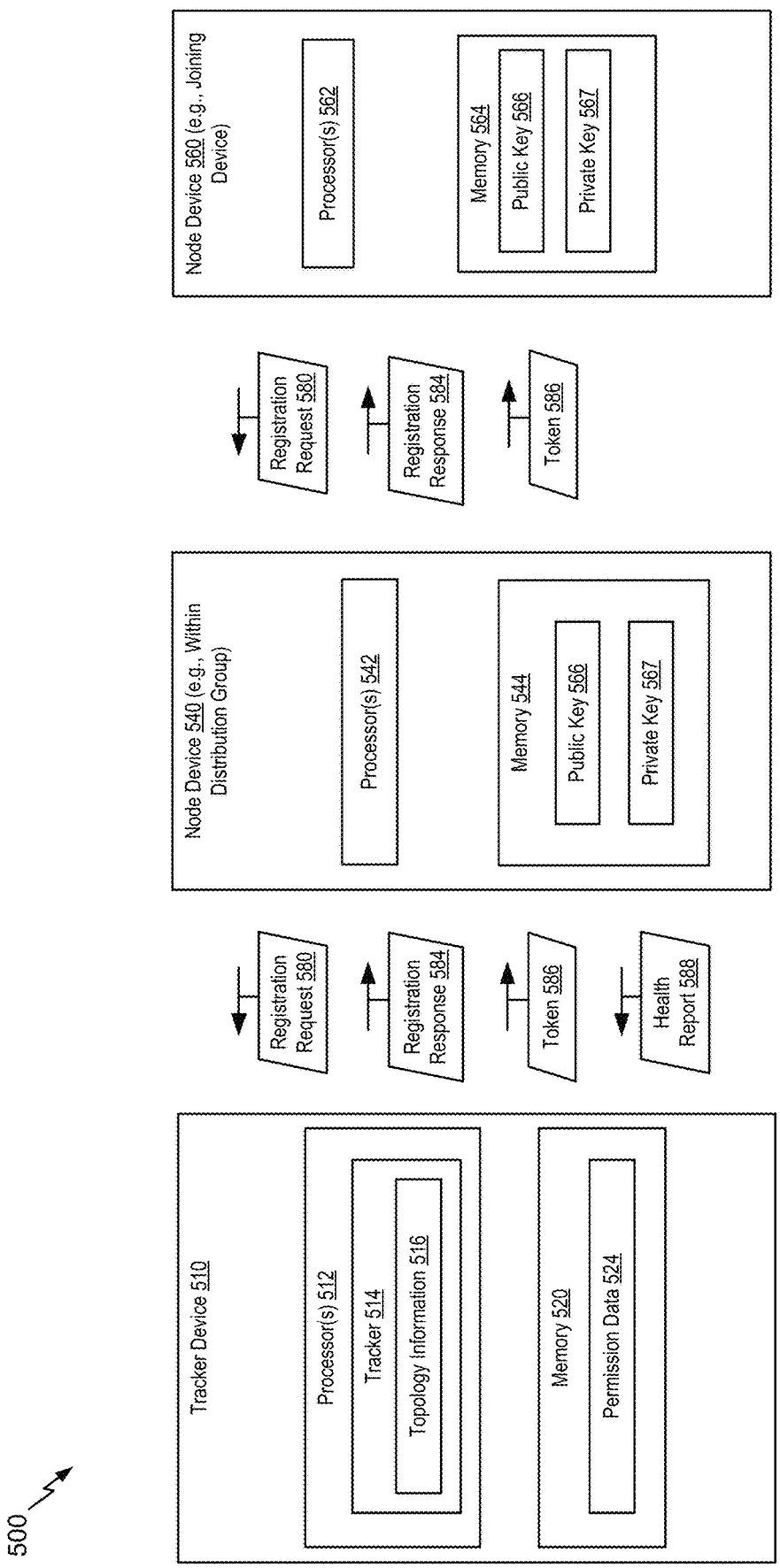
FIG. 5 is a block diagram of another example of a system for software distribution across a hierarchical network.

Referring to FIG. 5, a block diagram of a system for joining a hierarchical network for software distribution according to one or more aspects is shown and designated 500. The hierarchical network described with reference to FIG. 5 may include or correspond to the hierarchical network described with reference to FIG. 3 and may include any of tiers 360, 362, 364, and 366.

System 500 includes tracker device 510, node device 540, and node device 560. System 500 may include or correspond to at least a portion of any of systems 100, 200, 300, or 400. For example, in some implementations, tracker device 510 includes or corresponds to root device 302 or tracker 402. As additional examples, node devices 540 and 560 may correspond to any of the node devices depicted in any of FIGS. 1-4.

In some examples, tracker device 510 may include one or more processors 512 and memory 520. One or more processors 512 may execute tracker 514, which may generate or maintain topology information 516. Although described as topology information, in some implementations topology information 516 may also include distribution information of files distributed within a hierarchical network (e.g., system 500). Node device 540 may include one or more processors 542 and memory 544, and node device 560 may include one or more processors 562 and memory 564.

During operation, node device 560 (e.g., a new node device or a joining node device) may initiate a request to join the hierarchical network. For example, node device 560 may send a registration request message 580 to one or more node devices of a distribution group of the hierarchical network. The registration request message 580 indicates a request for the node device to join the hierarchical network. In the example of FIG. 5, the one or more node devices of the distribution group may include or correspond to the node device 540. To further illustrate, in an illustrative example, node device 560 may correspond to node device N22, node device 540 may correspond to any of node devices N21 or N23-N26, and the distribution group may correspond to distribution group 316 of FIG. 3. The request (e.g., registration request message 580) may be sent by node device 560 as part of a registration process with the hierarchical network that includes one or more registration operations. The one or more registration operations may include node device 560 requesting and/or receiving a public certificate from tracker device 510 (or node device 540). The one or more registration operations may also include requesting and/or receiving a signed child-cert from tracker device 510, via node device 540, over a Secure Sockets Layer (SSL). Node device 560 may store one or more received certificates and initiate listening operations. For example, node device 560 may listen to HTTP/2 connections on port 8852, as a non-limiting example. Additionally or alternatively, node device 560 may report livelihood information to node device 540, for forwarding to tracker device 510, periodically or non-periodically. In some implementations, during the one or more registration operations, node device 560 may provide an indication of an available bandwidth, a network interface via which the node device 560 is to listen, or both.

Node device 540 may forward registration request message 580 to tracker device 510. In some other examples, node device 540 may forward registration request message 580 to one or more other node devices, such as to a parent node/a parent group of a higher tier, which may forward the registration request message 580 to tracker device 510 (or to a parent node/parent group of a higher tier, and so on, until eventually registration request message 580 is forwarded to tracker device 510). As an illustrative example, node device N9 may forward registration request message 580 to any of node devices N1-N4, which may forward the registration request message 580 to tracker device 510, which may correspond to root device 302 in some examples.

Tracker device 510 may receive registration request message 580. In some examples, tracker device 510 may receive registration request message 580 from a node device of a first distribution group, and registration request message 580 may indicate that node device 560 is capable of communication with a node device of a second distribution group (e.g., by being included within a common local network or geographic location as the node device of the second distribution group). As an illustrative example, node device 540 may belong to a distribution group of first tier 362 (such as distribution group 304), and node device 560 may be capable of communication with node devices of a distribution group of second tier 364 (such as distribution group 308). In such examples, the first distribution group may correspond to distribution group 304, and the second distribution group may correspond to distribution group 308.

In some implementations, registration request message 580 may include identification information associated with node device 560. Tracker device 510 may use the identification information to verify an identity of node device 560. Verification of the identity may be performed by tracker device 510, such as based on identity information or permission data stored at memory 520 or at a storage location accessible to tracker device 510, or verification of the identity may be performed by an external identity verification service. Based on verifying the identity of node device 560, tracker device 510 may send, to the first distribution group, one or more of public key 566 or token 586 corresponding to authorization for node device 560 to join the hierarchical network and/or to perform P2P communication with devices within the hierarchical network. One or more of the public key 566 or token 586 may enable (e.g., authorize) node device 560 to download a release bundle or other files, or to receive a release bundle or files that are pushed from a parent distribution group, as described further with reference to the example of FIG. 6. Node device 560 may receive one or more of the public key 566 or token 586 based on node device 560 being associated with permission (e.g., permission indicated by the permission data 524) to receive a software release or one or more files. The permission may correspond to node device 560, a user associated with node device 560, or both. By providing token 586 (and/or public key 566) based on successful verification of node device 560, tracker device 510 may provide security, enforce permissions, and provide oversight of which devices are allowed to join the hierarchical network and perform P2P communications with devices within the hierarchical network, as compared to conventional P2P networks in which there is no centralized oversight or enforcement of permissions. For example, in conventional P2P networks, a device may receive files from a peer device upon successful association with the peer device, and there is no registration or management of network topology supported by the peer devices.

In some examples, prior to sending token 586, tracker device 510 determines whether to allow node device 560 to receive a release bundle based on permission data 524 corresponding to node device 560. For example, permission data 524 may include or correspond to a list of node devices that are authorized (e.g., licensed) to support a particular software application that is to be updated via the release bundle. Based on a determination that node device 560 is permitted to receive the release bundle (e.g., based on determining that the list indicates node device 560), or is permitted to receive each file (e.g., artifact) thereof, tracker device 510 may configure token 586 to enable receipt of the release bundle (such as by setting a bit, a flag, or one or more values or fields of token 586 to indicate that node device 560 is authorized to receive the release bundle). Additionally or alternatively, token 586 may be configured to expire after a time period. For example, the time period may be 30 seconds, as an illustrative, non-limiting example. The token 586 may indicate a time period during which node device 560 may perform one or more activities, such as P2P downloading. In some implementations, token 586 may correspond to a particular file or group of files, such as one or more files of a software release, such that the one or more activities are restricted to operations corresponding to the particular file or group of files. The time period of token 586 may be extendable/renewable by tracker device 510 or node device 560. For example, node device 560 may be able to extend the time period or may request tracker device 510 to extend the time period.

Tracker device 510 may assign node device 560 to a distribution group based on registration request message 580 indicating that node device 540 is associated with a particular distribution group. For example, tracker device 510 may identify that node device 560 is to be assigned to distribution group 316 based on registration request message 580 indicating that node device 560 is communicatively coupled to at least node device N9 of distribution group 308 and/or one or more of node devices N21-N26 of distribution group 316. In some such examples, tracker device 510 may assign node device 560 to a distribution group that is a nearest distribution group served by a distribution group that includes the distribution node indicated in registration request message 580.

Tracker device 510 may update topology information 516 to include the assignment of node device 560 to the hierarchical network. For example, tracker device 510 may update topology information 516 to indicate that distribution group 316 includes node device 560, such as by adding an identifier of node device 560 to the topology information 516 and by adding a pointer from the identifier to distribution group 316. Additionally or alternatively, tracker device 510 may update topology information 516 to indicate that distribution group 316 is communicatively coupled to node device 540, that distribution group 316 is included in a particular tier of the hierarchical network.

Tracker device 510 may send a registration response message 584 responsive to the registration request message 580. In some examples, tracker device 510 may send the registration response message 584 to node device 540, and node device 540 may forward registration response message 584 to node device 560.

Node device 560 may receive registration response message 584 from one or more node devices of a distribution group, such as from node device 540. Registration response message 584 indicates an assignment of node device 560 to a distribution group corresponding to a lower tier of the hierarchical network that is below a tier that includes the distribution group of node device 540. As an example, registration response message 584 may indicate assignment of node device 560 to distribution group 316, which may correspond to third tier 366 that is below second tier 364 that includes distribution group 308.

Registration response message 584 may indicate a plurality of node devices included in the distribution group from which registration response message 584 is received. For example, node device 560 may receive registration response message 584 from distribution group 308, and registration response message 584 may indicate node devices N9-N11. As a result, registration response message 584 may enable node device 560 to communicate with any or all of the devices within the distribution group 308 (e.g., by identifying node devices N9-N11 of distribution group 308). Additionally or alternatively, registration response message 584 may indicate one or more node devices of the distribution group to which node device 560 is assigned, such as node devices N21-N26 of distribution group 316.

Registration response message 584 may further indicate node devices included in one or more distribution groups corresponding to one or more higher tiers of the hierarchical network that are above the tier that includes the distribution group (e.g., that includes node device 540) and a device corresponding to a top tier of the hierarchical network. To illustrate, node device 560 may be included in distribution group 316 of third tier 366 of FIG. 3, and registration response message 584 may indicate distribution group 304 of first tier 362, distribution group 308 of second tier 364, and root device 302 corresponding to top tier 360.

In some implementations, devices that successfully register with the hierarchical network may receive a public key 566 (or a certificate) that allows the device to decrypt messages within the hierarchical network. For example, node device 540 may forward public key 566 to node device 560 with registration response message 584. Node device 660 may use public key 566 to perform one or more communications with devices of the hierarchical network, such as by encrypting or decrypting messages, or including public key 566 in messages. Additionally or alternatively, each device in the hierarchical network may receive one or multiple types of private keys (e.g., join keys) depending on a level of participation and trust corresponding to the device, such as a private key 567. As a non-limiting example, the hierarchical network may support three private keys referred to as a Type 1 key, a Type 2 key, and a Type 3 key. The Type 1 key may be received as part of a certificate exchange between a joining device (e.g., a node device) and the network. To illustrate, after verifying a join key, a new certificate may be generated for the joining node device and provided for storage at the node device. If any parameters which the certificate is based on (e.g., self-identification parameters of the node device) change or the certificate is lost or becomes invalid, the certificate should be re-exchanged using the same exchange process. As an example, node device 560 may receive, after successful registration, private key 567 and a network-signed certificate that enable communications, including P2P communications, between node device 560 and other devices of the hierarchical network. The Type 2 key may be received as part of a certificate exchange process similar to the Type 1 key except starting with a self-signed certificate of the client device. As an example, node device 560 may, as part of registration, apply a digital signature to a certificate to create a signed certificate (e.g., a self-signed certificate) that is sent to tracker device 510, and node device 560 may receive, after successful registration, private key 567 and a network-signed version of the signed certificate that enable communications, including P2P communications, between node device 560 and other devices of the hierarchical network. Additional details of the Type 2 key exchange (e.g., a self-signed certificate exchange) are described further herein with reference to FIG. 7. The Type 3 key may be received as part of a certificate exchange process similar to the Type 1 key except starting with a pre-signed certificate of the client device that is signed by a trusted access source (e.g., an outside verification service). In some such implementations, expiration of the pre-signed certificate may be verified before exchange, together with the chain of the certificate, as the Access root certificate may have changed or the origin may no longer be trusted. If such verification fails, the client device may register and perform the process for the Type 2 key using the pre-signed certificate as a self-signed certificate. As an example, node device 560 may, as part of registration, send a signed certificate that is signed with a digital signature of a trusted external verification service to tracker device 510, and node device 560 may receive, after successful registration, private key 567 and a network-signed version of the signed certificate that enable communications, including P2P communications, between node device 560 and other devices of the hierarchical network.

In some implementations, a health report may be communicated to indicate modification of the hierarchical network, such as addition of a node device to the hierarchical network, removal of a node device from the hierarchical network, or both. To illustrate, tracker device 510 may receive health report 588 from node device 540, and health report 588 may indicate that an additional node device (e.g., node device 560) has been added to the hierarchical network. In some examples, node device 540 is included in a first distribution group of first tier 362 of FIG. 3, and health report 588 indicates that the additional node device has been added to one of a second plurality of distribution groups of second tier 364 or third tier 366. Tracker device 510 may update topology information 516 based on addition of the additional node device. Alternatively, if node device 540 receives an indication from another node device in the same distribution group or a distribution group of a lower tier in the hierarchical network that the other node device is disassociating from node device 540 or otherwise terminating communications, health report 588 may indicate that the other node is to be removed from the hierarchical network.

Figure 6:
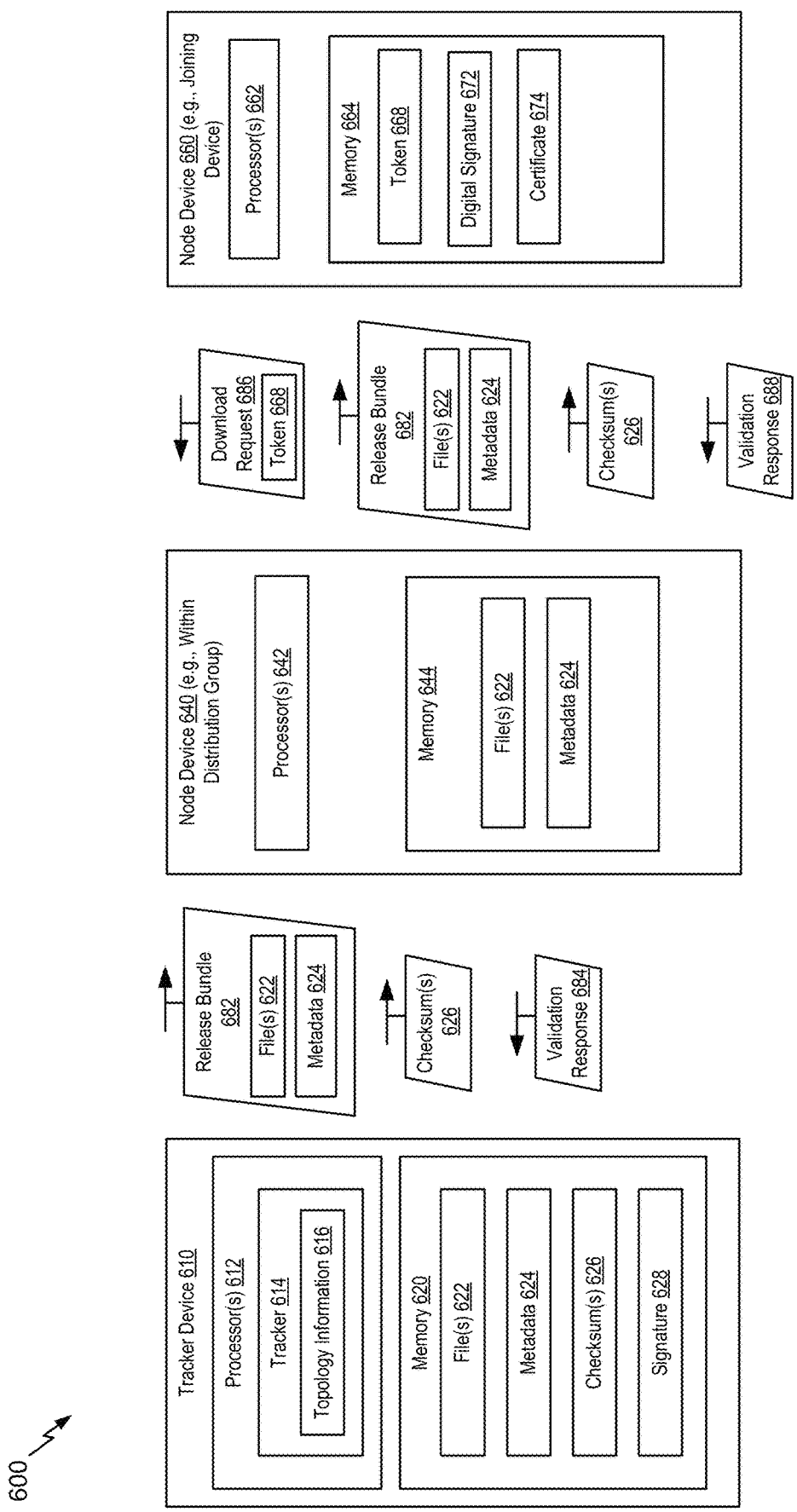
FIG. 6 is a block diagram of another example of a system for software distribution across a hierarchical network.

Referring to FIG. 6, a block diagram of a system for software distribution in a hierarchical network according to one or more aspects is shown and designated 600. The hierarchical network described with reference to FIG. 6 may include or correspond to the hierarchical network described with reference to FIG. 3 and may include any of tiers 360, 362, 364, and 366. In some examples, operations described with reference to FIG. 6 may be performed after one or more operations described with reference to FIG. 5 (such as after receiving the registration request message 580 and after sending the registration response message 584).

System 600 includes tracker device 610, node device 640, and node device 660. System 600 may include or correspond to at least a portion of any of systems 100, 200, 300, 400, or 500. For example, in some implementations, tracker device 610 includes or corresponds to one or more of root device 302, tracker 402, or tracker device 510. As additional examples, node devices 640 and 660 may correspond to any of the node devices depicted in any of FIGS. 1-5.

In some examples, tracker device 610 may include one or more processors 612 and memory 620. One or more processors 612 may execute tracker 614, which may indicate or maintain topology information 616. Node device 640 may include one or more processors 642 and memory 644, and node device 660 may include one or more processors 662 and memory 664.

During operation, node device 660 may identify that a software update is available for deployment. For example, one or more processors 662 may execute software that is to be updated via release bundle 682. The software release may include the one or more artifacts (e.g., one or more of files) and release information, such as one or more checksums, metadata, or a combination thereof, as further described in U.S. patent application Ser. No. 16/399,905. Alternatively, node device 660 may determine to download one or more files that have already been distributed to other node devices of the hierarchical network (e.g., the PDN). In some implementations, node device 660 may receive an alert message or other indication from a device (such as tracker device 610, via one or more node devices including node device 640) indicating that release bundle 682 is available. Depending on the implementations, the alert message may be a "push" message initiated by the device or a "pull" message requested by node device 660. Additionally or alternatively, node device 660 may request release bundle 682 or one or more files (e.g., via a pull operation) or may be provided with release bundle 682 or one or more files independent of a request (e.g., via a push operation).

In some implementations, after identifying that the software update is available, node device 660 may determine whether token 668 is valid. Token 668 may correspond to token 586 of FIG. 5. In some circumstances, node device 660 may determine that token 668 is invalid (e.g., expired). In some such examples, node device 660 may send a request to renew token 668 to one or more node devices, such as node device 640. In some examples, the one or more node devices may forward the request to renew token 668 to tracker device 610. Tracker device 610 may validate node device 660 (e.g., based on identification information associated with node device 660 indicated by the request, permissions corresponding to node device 660 or a user thereof, etc.) and may issue a renewed version of token 668 to node device 660.

Node device 660 may send download request 686 corresponding to a software release to one or more upstream node devices (e.g., node devices in a higher tier of the hierarchical network). In some examples, the software release includes or corresponds to release bundle 682, and download request 686 includes or corresponds to a request to distribute one or more files 622 of release bundle 682 within the hierarchical network. In some examples, download request 686 includes token 668 (e.g., after renewing token 668 with tracker device 610 if needed). In some examples, token 668 may enable (e.g., authorize) node device 660 to download release bundle 682. In some other implementations, instead of sending download request 686 to one or more upstream node devices, one or more upstream node devices may initiate transfer of release bundle 682 or one or more files to node device 660, and node device 660 may provide token 668 to be authorized to receive the file transfer.

Node device 660 may send download request 686 to one or more node devices included in a parent distribution group of the hierarchical network. To illustrate, in some examples, the upstream distribution group corresponds to distribution group 308, and the one or more node devices include or correspond to one or more of node devices N9-N11. One or more node devices of the hierarchical network may forward the download request 686 to the tracker device 610. For example, node device 640 may receive download request 686 from node device 660 and may forward download request 686 to tracker device 610 (via one or more intervening distribution groups if applicable). Alternatively, if node device 640 already stores release bundle 682 (or portion(s) thereof), node device 640 may respond to download request 686 without forwarding download request 686 to tracker device 610 if token 668 for node device 660 was already generated and is provided to node device 640 with download request 686.

Tracker device 610 may receive download request 686. Tracker device 610 may perform one or more operations based on receiving download request 686. For example, tracker device 610 may generate or send release bundle 682. Alternatively, tracker device 610 may generate and distribute release bundle 682 based on a user instruction or an instruction from another device assigned to a higher tier of the hierarchical network, such as based on a push operation to distribute release bundle 682 to neighboring distribution groups. In some examples, generating release bundle 682 includes generating one or more checksums 626. Depending on the example, checksums 626 may include a checksum for each file of the one or more files 622, a checksum for an entirety of the one or more files 622, or a combination thereof. In some such examples, tracker device 610 may provide checksums 626 to devices of the hierarchical network. Checksums 626 may correspond to multiple portions of the one or more files 622 and may enable verification that each portion of one or more files 622 is received. To illustrate, tracker device 610 may send checksums 626 to node device 640. Node device 640 may use the checksums 626 to verify that node device 640 has received each portion of one or more files 622. As another example, node device 640 may forward checksums 626 to node device 660. Node device 660 may receive checksums 626 and may verify whether each of the multiple portions of the one or more files 622 are received based on checksums 626, as further described below. Additionally or alternatively, checksums 626 may include one checksum that corresponds to an entirety of the one or more files 622 (or an entirety of release bundle 682), and the checksum may be used by node devices (or client devices) to verify reception of an entirety of the one or more files 622 (or an entirety of release bundle 682).

Tracker device 610 may send release bundle 682 to one or more distribution groups of a first plurality of distribution groups for P2P distribution within one or more distribution groups. Release bundle 682 sent by tracker device 610 may include one or more files 622 and metadata, such as release bundle metadata 624. For example, one or more files 622 may include one or more artifacts and properties, and release bundle metadata 624 may include information corresponding to a software release, such as a release name, a version number, an author, a release date, related files or libraries, or the like. Release bundle 682 may be signed, atomic, and immutable. In an example, the first plurality of distribution groups may include distribution groups of first tier 362, such as distribution groups 304, 306, and the one or more distribution groups may include distribution group 304. In some implementations, different portions of release bundle 682 may be distributed to different devices of a distribution group. For example, a first portion (e.g., a first file or set of files, or portion(s) of a file) of release bundle 682 may be provided to a first node device of the distribution group, and a second portion of release bundle 682 may be provided to a second node device of the distribution group. In some such implementations, tracker device 610 may send different portions of release bundle 682 to different devices of the distribution group in parallel (e.g., concurrently) to increase the speed with which release bundle 682 is distributed to lower tiers of the hierarchical network.

Node devices within the one or more distribution groups may perform P2P distribution of release bundle 682 to other node devices within the same distribution group. To illustrate, in some examples, each node device N1-N4 of distribution group 304 may store (or cache) a different respective portion (or "chunk") of release bundle 682 by downloading the respective portion from tracker device 610. In some examples, node devices N1-N4 may perform P2P communications with one another (e.g., to exchange respective portions of release bundle 682) so that each node device N1-N4 stores a full copy of release bundle 682. In such examples, node devices of each distribution group of the hierarchical network may perform P2P communications with other node devices of the distribution group to share at least a portion of release bundle 682 with one or more other node devices of the distribution group. In some implementations, node devices of distribution groups may perform P2P communications using tokens or other security measures. For example, a node device may request a file (or a portion thereof) from a peer device and may provide a token to the peer device to prove that the node device has been authorized to download the file (or portion thereof). Alternatively, node devices, after being validated and approved to join the hierarchical network, may receive propagation of a release bundle being distributed to the hierarchical network. For example, tracker device 610 may push (e.g., propagate or distribute) release bundle 682 to one or more downstream node devices, along with tokens for each node device that is to receive release bundle 682. Node devices may perform P2P communications with peer devices (e.g., node devices within the same distribution group) to retrieve one or more missing files (or portions thereof) of release bundle 682, as compared to waiting to receive an entirety of release bundle 682 from tracker device 610. After node devices of a distribution group have distributed release bundle 682 amongst themselves, the node devices may begin transferring release bundle 682, and tokens for all downstream node devices to receive release bundle 682, to one or more child distribution groups. Similarly, one or more of node devices N9-N11 may retrieve portions of release bundle 682 from distribution group 308 and may store (or cache) different respective portions of release bundle 682. Node devices N9-N11 may perform P2P communications with one another (e.g., to exchange respective portions of release bundle 682) so that each node device N9-N11 stores a full copy of release bundle 682. Similar operations may be performed by one or more of node devices N21-N26 of distribution group 316 such that node devices, including node device 660, store (or cache) release bundle 682. In this manner, release bundle 682 may be distributed from one distribution group to one or more child distribution groups such that release bundle 682 is distributed to all the distribution groups of the hierarchical network, either through downstream node devices requesting release bundle 682 or through proactive propagation of release bundle 682 throughout the hierarchical network. Although described in the context of release bundles, in other implementations, the above-described operations may be performed for either pull-based or push-based distribution of any one or more artifacts (e.g., files).

In some examples, tracker device 610 may identify targets of a software release associated with release bundle 682 based on distribution information included in download request 686. Tracker device 610 may determine a set of intermediate distribution groups located between the device (e.g., node device 660) and the targets in the hierarchical network based on topology information 616. The set of intermediate distribution groups may include the one or more distribution groups of the first plurality of distribution groups. To illustrate, the first plurality of distribution groups may include distribution groups of first tier 362, such as distribution groups 304, 306, and the set of intermediate distribution groups may include distribution group 304, and the targets in the hierarchical network may include one or more of the node devices N9-N11 of distribution group 308 and/or node devices N21-N26 of distribution group 316 of FIG. 3.

In some implementations, each distribution group within the hierarchical network may operate as a least recently used (LRU) cache for storing release bundles and/or downloaded files for one or more distribution groups assigned as descendants (e.g., children/downstream groups) of the distribution group within the hierarchical network. As an example, node device 640 may be included in a first distribution group and may operate as a LRU cache for storing release bundle 682 for a second distribution group assigned as a descendent of the first distribution group, for a client device communicatively coupled to node device 640, or both.

Node device 660 may download release bundle 682 (or portion(s) thereof) using P2P distribution from one or more node devices N9-N11 (e.g., of a parent distribution group) and/or from peers (e.g., node devices N21-N26) within its own distribution group using P2P distribution. In some implementations, node device 660 may receive one or more portions of release bundle 682 directly from node device 640, or another node device of the same distribution group, via the connection between node device 660 and node device 640, and remaining portions may be received by node device 660 from peers within its distribution group using P2P communications. Alternatively, node device 660 may use P2P communications to receive portion(s) of release bundle 680 from both node devices of the parent distribution group and node devices of the distribution group that includes node device 660.

As described above, such downloading may be responsive to node device 660 sending download request 686, including token 668 to the various upstream and/or peer devices for verification of token 668 prior to initiation of any downloading of release bundle 682 (or portions thereof), or other files. In order to download release bundle 682, node device 660 may establish a connection with node device 640, or any other node device assigned to the distribution group that is a parent of the distribution group to which node device 660 is assigned. In some implementations, node device 660 may establish an HTTP/2 connection with node device 640 or any other node device in the parent distribution group. For example, node device 660 may attempt to establish an HTTP/2 connection with one or more of the node devices, such as node device 640, with the intent to keep the connections alive and saturated for best bandwidth.

In some implementations, node device 660 may select a portion of release bundle 682 for P2P download randomly or based on one or more rules. For example, the one or more rules may include a first rule in which portions are selected based on rarity. Rarity may be determined based on a number of devices that have the portion to offer. For example, a portion may be considered rare if two or fewer devices have the portion. As another example, rarity may be determined relative to other portions or as any portion in which less of a majority of devices (identified to node device 660) have the portion. A second rule of the one or more rules may indicate that if multiple portions can be selected (and/or are rare), a portion is selected based on index value if the portion includes a file for streaming. To illustrate, a portion with a low index value (e.g., a low position) in the file may be selected so that node device 660 can start streaming a result to a user or a client device as the portion(s) come in. Alternatively, node device 660 may request the release bundle 682 without identifying a portion, or node device 660 may be scheduled to receive release bundle 682 without a request (e.g., as a result of a push from tracker device 610 or node device 640 as part of proactive propagation of release bundle 682 or other files).

After selection of the portion of the file, node device 660 can send requests, via the established connections (e.g., HTTP/2) to one or more devices, including node device 640, for the portion. For example, node device 660 sends download request 686 to node device 640, in some implementations including token 668 or other security information, as described above. Node device 660 may receive release bundle 682 from one or more node devices of the parent distribution group that includes node device 640, one or more peer devices of the distribution group to which node device 660 is assigned, or both. For example, node device 660 may receive at least a portion of release bundle 682 from node device 640 via HTTPs (SSL). Additionally or alternatively, node device 660 may send download request 686 to another node device of the same distribution group as node device 640 or to one or more node devices (e.g., peers) of the distribution group to which node device 660 is assigned, and node device 660 may receive other portions of release bundle 682 from such node devices. In some implementations, node device 660 may receive multiple different portions of release bundle 682 from multiple different devices in parallel (e.g., concurrently) to increase the download speed of release bundle 682 at node device 660. It is noted that a node device, such as node device 640, can serve a number of downloads while maintaining a bandwidth less than or equal to a bandwidth download limit. For example, up to four downloads may be performed concurrently from a single node device, as a non-limiting example.

Additionally or alternatively, node devices may be configured to support throttling on an individual or group basis to limit the bandwidth devoted to file distribution within the hierarchical network. As an example, a node device may limit the amount of data (e.g., a number of bytes) that are downloaded during a time period. As another example, a node device may limit the number of devices that may receive files during a time period. The throttling (e.g., limiting the amount of data or nodes that may receive files) may be performed based on particular parameters of each node device, which may be communicated to tracker device 610 as part of the registration process. Alternatively, tracker device 610 may assign settings for use in performing throttling on a group-by-group basis or based on other considerations. Accordingly, a particular node device may temporarily refuse a download, and the requesting device may retry the same node or a different node device to perform the download. For example, if node device 640 refuses download request 686, node device 660 may retry (e.g., resend the request to) node device 640 or may send download request 686 to another node device of the parent distribution group or to a peer within the distribution group to which node device 660 is assigned. If all devices known to node device 660 to have a particular portion of release bundle 682 have been tried (and failed), node device 660 may send a request for updated topology information.

In some implementations, in response to receiving download request 686, node device 640 may verify that node device 660 is permitted to download release bundle 682. For example, node device 640 may check that token 668 included in download request 686 is valid, such as by checking that token 668 matches a token received from tracker device 610 (e.g., via one or more intervening distribution groups) that corresponds to node device 660. Alternatively, node device 640 may encrypt messages sent to node device 660 such that the messages are decryptable using token 668. Additionally or alternatively, node device 640 may compare token 668 or other permissions included in download request 686 (e.g., a Docker bearer token or Basic auth., as non-limiting examples) to entity information stored at node device 640, or node device 640 may forward token 668 (or the other permissions) to tracker device 610 for verification. If verification fails, node device 640 discards download request 686, notifies node device 660 that the verification failed, or both. If verification succeeds, node device 640 may initiate transfer of at least a portion of release bundle 682 to node device 660. Similar operations may be performed by other node devices responsive to download requests from node device 660.

Alternatively or in addition, in some implementations, node device 660 may perform one or more P2P communications described herein based on digital signature 672. In some examples, node device 660 may apply digital signature 672 to certificate 674 to create a signed certificate and may send the signed certificate to one or more node devices, such as node device 640. In some other examples, the signed certificate may be associated with or provided by a trusted external verification service, and node device 660 may send the signed certificate to the one or more node devices based on the digital signature 672 of the trusted external verification service. Additionally or alternatively, certificate 674 may correspond to one or more of the certificates described above with reference to FIG. 5. Based on sending the signed certificate, node device 660 may receive a network-signed version of the signed certificate from the one or more node devices. The network-signed version of the signed certificate may be configured to enable P2P communications between node device 660 and other devices of the hierarchical network, such as one or more of tracker device 610 or node device 640. Such a network-signed version of the signed certificate may be used instead of or in addition to token 668 in requesting downloads, may be used to encrypt messages between node device 660 and other devices within the hierarchical network, or a combination thereof.

Node device 660 may receive sufficient portions to create an entirety of release bundle 682, from node device 640 and/or other devices, which may be stored at a transaction directory of node device 660. Release bundle 682 may include one or more files 622 of a software release and release bundle metadata 624. Node device 660 may perform an update of software executed by one or more processors 662 based on release bundle 682. In some cases, after node device 660 receives portion(s) of release bundle 682, node device 660 may determine (e.g., based on checksums 626) that at least one portion of release bundle 682 (e.g., at least one portion of one or more files 622 or release bundle metadata 624) is received. In such examples, node device 660 may send validation response 688 to node device 640, and node device 640 may forward validation response 684 to tracker device 610. Validation response 684 may indicate validation (e.g., based on checksums 626) of receipt of the at least one of the multiple portions of the one or more files 622 by node device 660 (and optionally, by other devices of the distribution group that includes node device 660). For example, node device 640 may aggregate multiple validation responses from devices of a child distribution group before forwarding the aggregated validation responses to tracker device 610. In some cases, node device 660 may determine (e.g., based on checksums 626) that one or more portions of one or more files 622 are not received. In such examples, validation response 688 may indicate that the one or more portions of the one or more files 622 has not been validated by node device 660.

In some other examples, instead of using multiple checksums 626, a single checksum 626 may be used to validate receipt of release bundle 682. To illustrate, tracker device 610 may send a single checksum 626 to node device 640, and node device 640 may forward the single checksum 626 to node device 660. The single checksum 626 may correspond to an entirety of the one or more files 622. Node device 660 may verify whether one or more files 622 are received based on the single checksum 626 and may send validation response 688 based on the single checksum 626. Alternatively, node device 660 may use both multiple portion-specific (e.g., file-specific) checksums and a single checksum corresponding to an entirety of release bundle 682 to verify whether an entirety of release bundle 682 has been received. Additionally or alternatively, in some examples, prior to sending release bundle 682, tracker device 610 may attach a signature 628 to the release bundle 682 to generate a signed release bundle 682. Tracker device 610 may send the signed release bundle 682 to one or more distribution groups for P2P distribution. Node device 660 may receive the signed release bundle 682 and may authenticate a source of the signed release bundle 682 based on the signature 628. In some other aspects, any or all of the above-described verification or authorization operations may be performed for one or more downloaded files, regardless of whether the files are part of a software release, if the accompanying checksums and/or signatures are received.

Tracker device 610 may receive validation response 684. In some examples, tracker device 610 may resend release bundle 682 (e.g., to the first distribution group) based on validation response 684 indicating that receipt of release bundle 682 by node device 660 is unsuccessful. Additionally or alternatively, tracker device 610 may send an updated token to the first distribution group for forwarding to node device 660 to enable node device 660 to request release bundle 682 for a longer time period, from other devices (e.g., of a different distribution group), or a combination thereof.

In some implementations, release bundle 682 (e.g., at least one file of the one or more files 622) may correspond to an executable file package. Release bundle 682 may include resource assignment information corresponding to the executable file package, interdependencies associated with the at least one file, or both. As an illustrative example, the executable file package may include a Docker container, and node device 660 may execute a Docker client (e.g., a container registry client) to receive software releases and software updates from tracker device 610 (or a server or other device within a top tier of the hierarchical network), which may also include or be configured to operate as a container registry, such as being configured to communicate via a container registry API. To enable communication with the container register API, the Docker client of node device 660 may be configured to communicate with a container registry shim running on node device 660. The container registry shim may include a library that transparently intercepts API calls and changes the arguments passed, handles the operations itself, or redirects operations elsewhere. The communication between the Docker client and the container registry shim may be performed using a container registry API supported by node device 660. For example, the Docker client may send a Docker request to the container registry API and the container registry API may send a corresponding request to the container registry shim.

The container registry shim may translate Container Registry API calls to two types of requests: 1) login requests and 2) container-layer download requests. For a login request, the login request may be proxied by the container registry shim to the container registry (of tracker device 610), and tracker device 610 authenticates the Docker client of node device 660. For a container-layer download request, the container registry API may translate the request issued by the Docker client into a container-layer download request if the Docker request included "/aip/v2/blobs/ . . . ", as an illustrative, non-limiting pseudo example of an API call. The container-layer download request may be translated by container registry shim to a direct file download request (e.g., download request 686), which is handled by a P2P agent (e.g., P2P client logic) configured on node device 660. A file download is served as a P2P file download, effectively serving container-layer downloads using P2P optimization, and dramatically speeding up the delivery of a container image (that is comprised of multiple layers) to the Docker client of node device 660. Additionally, software releases may be designed to take advantage of permissions and features supported by executable file packages or containers, such as Docker, without requiring distribution by a typical CDN and sacrificing the speed, network congestion, and redundancy benefits of P2P networks. Additionally or alternatively, client device(s) communicatively coupled to node device 660 may execute a container, such as a Docker container, to receive software releases or services provided by node device 660 without requiring a particular system configuration or execution of a particular application or operating system.

In some examples, one or more devices may receive updated topology information 616 in response to a change in topology of the hierarchical network, based on other trigger condition(s), or periodically. For example, updated topology information 616 may indicate changes to one or more distribution groups corresponding and/or tiers in the hierarchical network. To further illustrate, one or more processors 612 may assign an additional node device to one of the first plurality of distribution groups, may update topology information 616 based on assignment of the additional node device, and may send the updated topology information 616 to the first plurality of distribution groups.

As described above, systems 100, 200, 300, 400, 500, and 600 of FIGS. 1-6 provide benefits compared to conventional CDNs or P2P networks for software release deployment and distribution. For example, the hierarchical network of FIGS. 3-6 (e.g., the PDN) enables a software deployment server (e.g., an Artifactory server) or other tracker device (e.g., root device 302, tracker 402, tracker device 510, and/or tracker device 610) to maintain a flexible network topology that can be dynamically configured based on available devices within the network, instead of being configured based on a fixed topology like a CDN. For example, tracker device 510 may update topology information 516 based on node device 560 joining the hierarchical network (e.g., via registration request message 580) to indicate assignment of node device 560 to a group or a tier within the hierarchical network. Additionally, the server or tracker device is able to check permissions and authorizations of devices prior to allowing the devices to join the hierarchical network or download the software release or files, providing improved security and varying permissions to be applied to different node devices and/or users, as compared to a typical P2P network. For example, tracker device 510 may validate node device 560 as part of the registration process, as described with references to FIG. 5, or when a download is requested, as described with reference to FIG. 6, and use of tokens may enable secure downloading by the node device. Devices of the hierarchical network also experience the increased download speed, reduced network congestion, and reduced bottlenecks/failure points, as compared to a typical CDN, through the use of P2P communication protocols and multiple device distribution groups. The systems and techniques of FIGS. 1-6 provide an ultra-scalable, highly-available, permission-aware, and container and package-aware hierarchical network that works over a WAN. Each node device may store and execute a lightweight application and have a low storage caching proxy, thereby requiring fewer processing resources and a smaller memory footprint than servers or node devices of a typical CDN. Additionally, the highest tier of the hierarchical network (e.g., the tracker device) provides security and authorization and activity auditing capabilities not available in a typical P2P network. Accordingly, an enterprise can use lower complexity and lower cost hardware to set up and manage a fast, secure, massively scalable PDN for software updates and file downloads, thereby significantly accelerating software distribution to speed up deployments and concurrent downloads across large-scale environments spanning hybrid infrastructure, edges, and IoT devices.

According to one aspect, a system for managing software distribution across a hierarchical network is described. The system includes at least one memory (e.g., memory 520 or memory 620) storing instructions and one or more processors (e.g., one or more processors 512 or one or more processors 612) coupled to the at least one memory. The one or more processors are configured to execute the instructions to cause the one or more processors to assign a first plurality of node devices (e.g., any of node devices N1-N8 of FIG. 3) to a first set of one or more distribution groups (e.g., distribution groups 304, 306) corresponding to a first tier (e.g., first tier 362) of the hierarchical network that is below a top tier (e.g., top tier 360). Each of the first plurality of node devices is assigned to one of the first set of distribution groups. The one or more processors are further configured to execute the instructions to cause the one or more processors to assign a second plurality of node devices (e.g., any of node devices N9-N20) to a second set of one or more distribution groups (e.g., distribution groups 308, 310, 312, and 314) corresponding to a second tier (e.g., second tier 364) of the hierarchical network that is below the first tier. Each of the second plurality of node devices is assigned to one of the second set of distribution groups, and a first distribution group of the first set of distribution groups is configured as a parent group of the second set of distribution groups. The one or more processors are further configured to execute the instructions to cause the one or more processors to maintain topology information (e.g., any of topology information 303, 516, or 616) indicating assignments of node devices to groups within the hierarchical network. The one or more processors are further configured to execute the instructions to cause the one or more processors to send one or more files (e.g., bundle 432 or release bundle 682, or any one or more files) to the first set of distribution groups for at least partial P2P distribution within the first set of distribution group.

According to another aspect, a computer program product is described that includes a computer-readable storage device, such as a non-transitory computer-readable storage medium, that includes instructions that, when executed by one or more processors (e.g., one or more processors 512 or one or more processors 612), cause the one or more processors to perform operations for managing software distribution across a hierarchical network. The operations include assigning a first plurality of node devices (e.g., any of node devices N1-N8 of FIG. 3) to a first set of one or more distribution groups (e.g., distribution groups 304, 306) corresponding to a first tier (e.g., first tier 362) of the hierarchical network that is below a top tier (e.g., top tier 360). Each of the first plurality of node devices is assigned to one of the first set of distribution groups. The operations further include assigning a second plurality of node devices (e.g., any of node devices N9-N20) to a second set of one or more distribution groups (e.g., distribution groups 308, 310, 312, and 314) corresponding to a second tier (e.g., second tier 364) of the hierarchical network that is below the first tier. Each of the second plurality of node devices is assigned to one of the second set of distribution groups, and a first distribution group of the first set of distribution groups is configured as a parent group of the second set of distribution groups. The operations further include maintaining topology information (e.g., any of topology information 303, 516, or 616) indicating assignments of node devices to groups within the hierarchical network. The operations further include sending one or more files (e.g., bundle 432 or release bundle 682, or any one or more files) to the first set of distribution groups for at least partial P2P distribution within the first set of distribution groups.

According to one aspect, a system for managing software distribution across a hierarchical network is described. The system includes at least one memory (e.g., memory 564 or memory 664) storing instructions and one or more processors (e.g., one or more processors 562 or one or more processors 662) coupled to the at least one memory. The one or more processors are configured to execute the instructions to cause the one or more processors to send a registration request message (e.g., registration request message 580) to a node device (e.g., to any of node devices N9-N20, to node device 540, or to node device 640) of a first distribution group of the hierarchical network. The registration request message indicates a request to join the hierarchical network. The one or more processors are further configured to execute the instructions to cause the one or more processors to receive a registration response message (e.g., registration response message 584) from the node device. The registration response message indicates an assignment to a second distribution group (e.g., any of distribution groups 316, 318, 320, and 322) corresponding to a lower tier (e.g., third tier 366) of the hierarchical network that is below a tier that includes the first distribution group (e.g., second tier 364). The registration response message further indicates node devices included in the first distribution group, node devices included in the second distribution group, or both. The one or more processors are further configured to execute the instructions to cause the one or more processors to receive a token (e.g., the token 586 or the token 668) from the node device. The token corresponds to authorization to perform P2P communications with the node devices of the second distribution group to retrieve at least a portion of one or more files. The one or more processors are further configured to execute the instructions to cause the one or more processors to send a download request message (e.g., the download request 686) corresponding to the one or more files to the node device, one or more other node devices of the second distribution group, or a combination thereof. The download request message includes the token.

According to another aspect, a computer program product is described that includes a computer-readable storage device, such as a non-transitory computer-readable storage medium, that includes instructions that, when executed by one or more processors (e.g., one or more processors 562 or one or more processors 662), cause the one or more processors to perform operations for managing software distribution across a hierarchical network. The operations include sending a registration request message (e.g., registration request message 580) to a node device (e.g., to any of node devices N9-N20, to node device 540, or to node device 640) of a first distribution group of the hierarchical network. The registration request message indicates a request to join the hierarchical network. The operations further include receiving a registration response message (e.g., registration response message 584) from the node device. The registration response message indicates an assignment to a second distribution group (e.g., any of distribution groups 316, 318, 320, and 322) corresponding to a lower tier (e.g., third tier 366) of the hierarchical network that is below a tier that includes the first distribution group (e.g., second tier 364). The registration response message further indicates node devices included in the first distribution group, node devices included in the second distribution group, or both. The operations further include receiving a token (e.g., the token 586 or the token 668) from the node device. The token corresponds to authorization to perform P2P communications with the node devices of the second distribution group to retrieve at least a portion of one or more files. The operations further include sending a download request message (e.g., the download request 686) corresponding to the one or more files to the node device, one or more other node devices of the second distribution group, or a combination thereof. The download request message includes the token.

Figure 7:
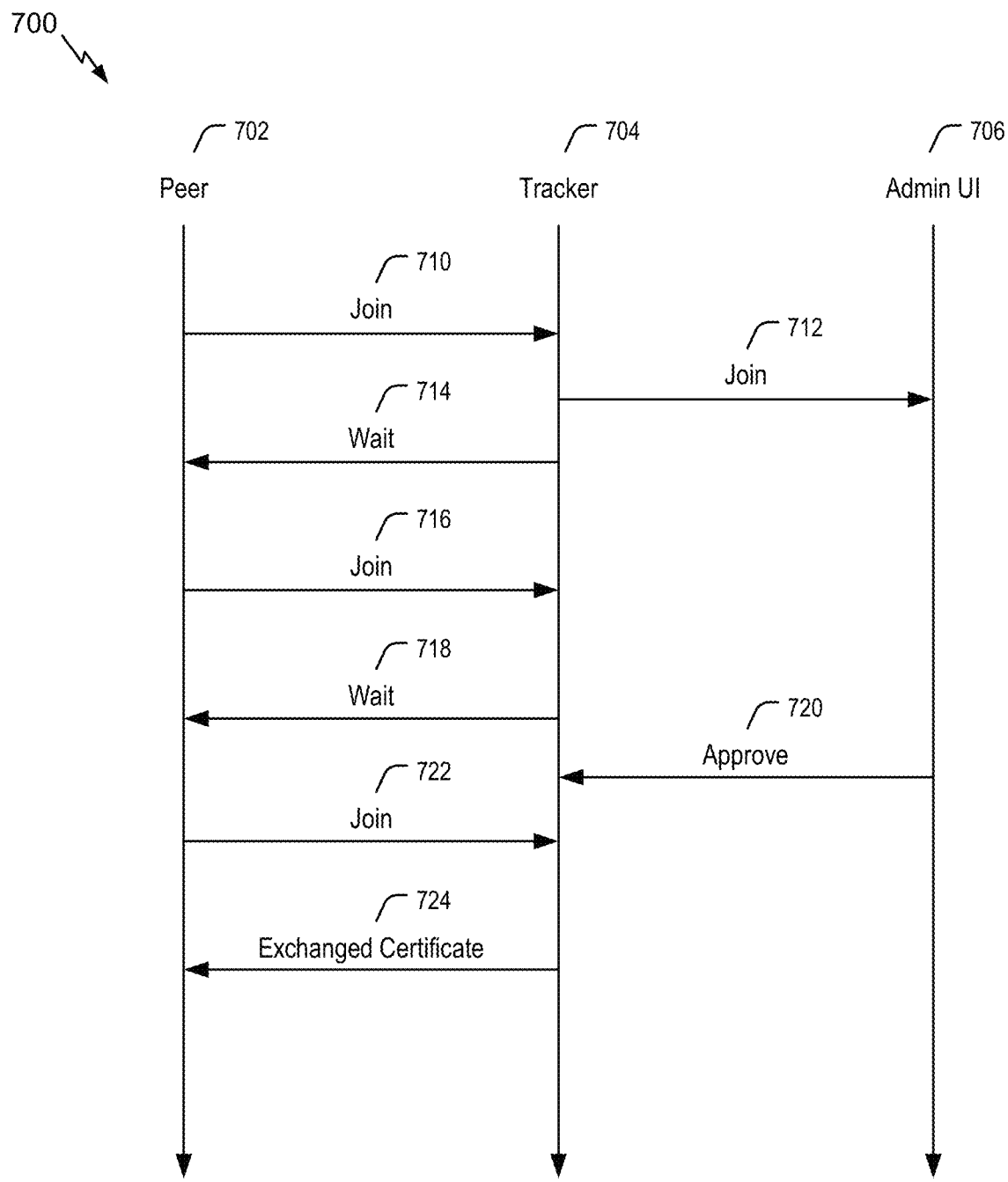
FIG. 7 is a diagram illustrating examples of operations for software distribution across a hierarchical network.

Referring to FIG. 7, a diagram of examples of operations for software distribution across a hierarchical network according to one or more aspects is shown as operations 700. In some examples, operations 700 are performed by peer 702, tracker 704, and admin user interface (UI) 706. In some examples, peer 702 corresponds to a node device (such as node device 560 or node device 660) joining a hierarchical network, and tracker 704 corresponds to tracker 402, tracker device 510, or tracker device 610. Operations 700 may be performed as part of a registration process with a hierarchical network, particularly part of a key/certificate exchange process.

Operations 700 may include sending a join request from peer 702 to tracker 704, at 710. The join request includes a signed certificate (e.g., a self-signed certificate) of peer 702. For example, peer 702 may apply its digital signature to a certificate to generate the signed certificate. In some examples, the join request may correspond to registration request message 580. Tracker 704 may forward the join request to admin UI 706, at 712. Tracker 704 and peer 702 may wait for a response from admin UI 706, at 714.

If no response from admin UI 706 is received, peer 702 may send a join request to tracker 704, at 716. In some examples, the join request may correspond to registration request message 580. Tracker 704 and peer 702 may wait for a response from admin UI 706, at 718. Although transmission of one additional join request is shown in FIG. 7, in other implementations, peer 702 may not send an additional join request or may send more than one additional join request prior to a response from admin UI 706.

Admin UI 706 may approve the join request, at 720. The approval may be indicated by a response message that includes a network-signed version of the signed certificate. For example, admin UI 706 may apply a digital signature of the hierarchical network to the received signed certificate (e.g., in the join request) to generate the network-signed version of the signed certificate. In response to another join request, at 722, tracker 704 may provide the network-signed version of the signed certificate to peer 702, at 724. Alternatively, tracker 704 may provide the network-signed version of the signed certificate to peer 702 in response to receiving approval from admin UI 706 without waiting for another join request from peer 702.

Figure 8:
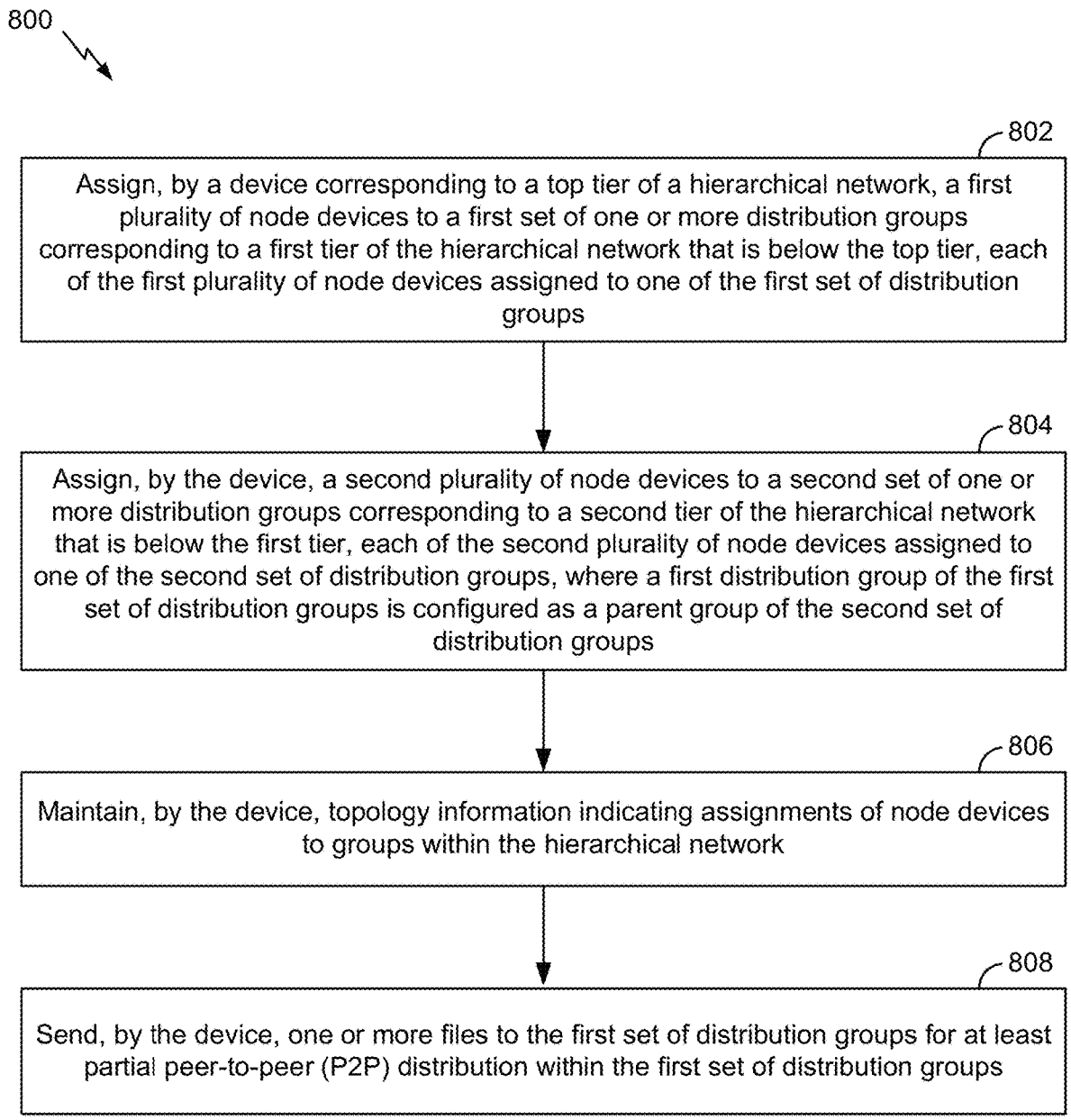
FIG. 8 is a flow diagram of an example of a method for managing software distribution across a hierarchical network.
Figure 9:
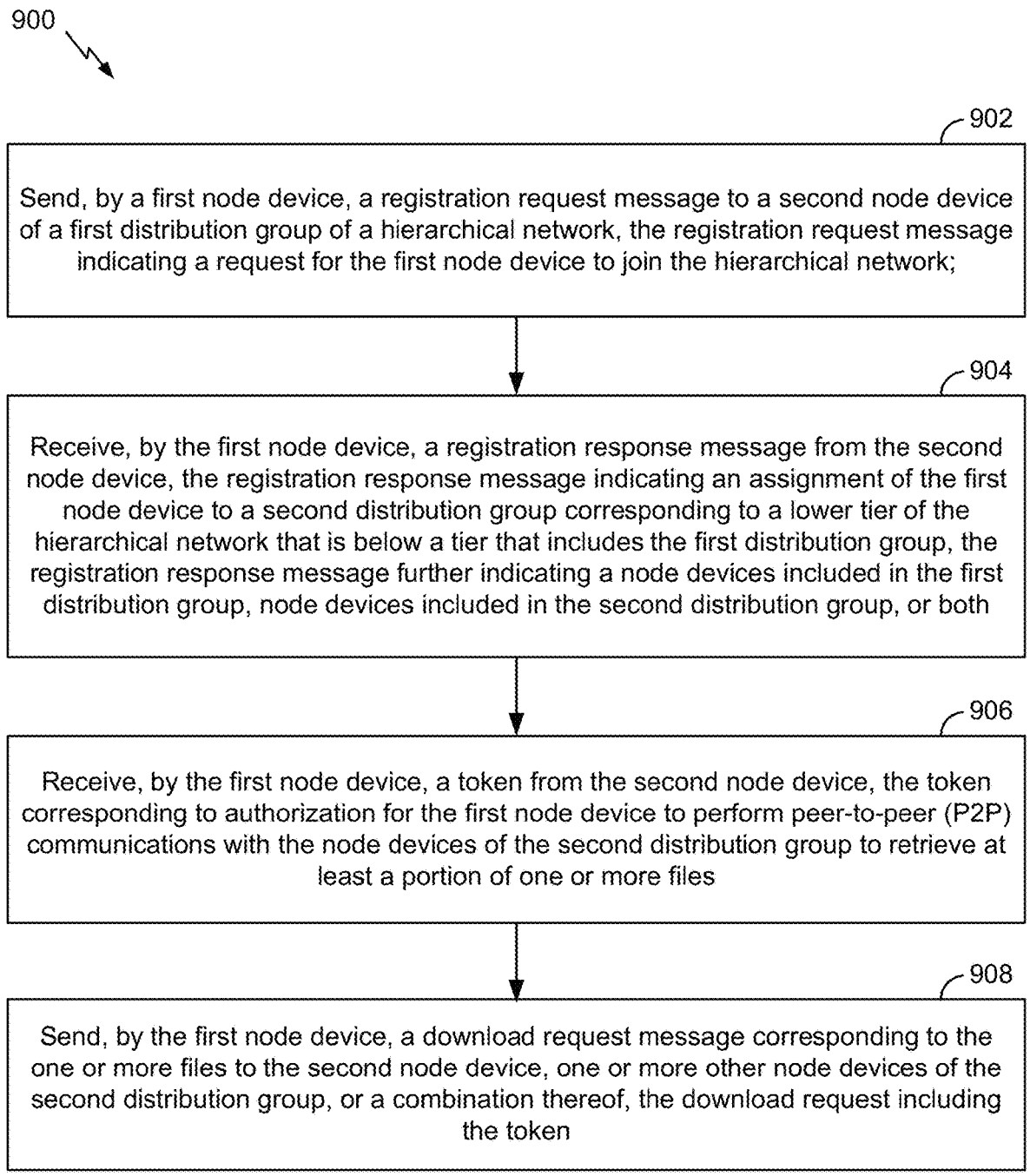
FIG. 9 is a flow diagram of another example of a method for managing software distribution across a hierarchical network.

FIGS. 8-9 are flow diagrams of methods of managing software distribution across a hierarchical network according to one or more aspects. Each of the methods of FIGS. 8-9 may be stored in a computer-readable storage medium as instructions that, when executed by one or more processors, cause the one or more processors to perform the operations of the method of FIG. 8 or FIG. 9.

Referring to FIG. 8, a flow diagram of a method for managing software distribution across a hierarchical network according to one or more aspects is shown as a method 800. In some implementations, method 800 may be performed by repository server 110, repository server 168, root device 302, tracker 402, tracker device 510, tracker device 610, and/or tracker 704.

At 802, method 800 includes assigning a first plurality of node devices (e.g., any of node devices N1-N8 of FIG. 3) to a first set of one or more distribution groups (e.g., distribution groups 304, 306) corresponding to a first tier (e.g., first tier 362) of the hierarchical network that is below a top tier (e.g., top tier 360). Each of the first plurality of node devices is assigned to one of the first set of distribution groups.

At 804, method 800 further includes assigning a second plurality of node devices (e.g., any of node devices N9-N20) to a second set of one or more distribution groups (e.g., distribution groups 308, 310, 312, and 314) corresponding to a second tier (e.g., second tier 364) of the hierarchical network that is below the first tier. Each of the second plurality of node devices is assigned to one of the second set of distribution groups, and a first distribution group of the first set of distribution groups is configured as a parent group of the second set of distribution groups.

At 806, method 800 further includes maintaining topology information (e.g., any of topology information 303, 516, or 616) indicating assignments of node devices to groups within the hierarchical network.

At 808, method 800 further includes sending one or more files (e.g., bundle 432 or release bundle 682, or any one or more files) to the first set of distribution groups for at least partial P2P distribution within the first set of distribution groups.

Referring FIG. 9, a flow diagram of a method for managing software distribution across a hierarchical network according to one or more aspects of the disclosure is shown as a method 900. In some implementations, method 900 may be performed by any of node devices N9-N41, node device 560, node device 660, and/or peer 702.

At 902, method 900 includes sending, by a first node device (e.g., any of node devices N9-N41, node device 560, node device 660, or peer 702), a registration request message (e.g., registration request message 580) to a second node device (e.g., to any of node devices N1-N20, to node device 540, or to node device 640) of a first distribution group of the hierarchical network. The registration request message indicates a request for the first node device to join the hierarchical network.

At 904, method 900 further includes receiving, by the first node device, a registration response message (e.g., registration response message 584) from the second node device. The registration response message indicates an assignment of the first node device to a second distribution group (e.g., any of distribution groups 308, 310, 312, 314, 316, 318, 320, and 322) corresponding to a lower tier (e.g., second tier 364 or third tier 366) of the hierarchical network that is below a tier that includes the first distribution group (e.g., first tier 362 or second tier 364). The registration response message further indicates node devices included in the first distribution group, node devices included in the second distribution group, or both.

At 906, method 900 further includes receiving, by the first node device, a token (e.g., the token 586 or the token 668) from the second node device. The token corresponds to authorization for the first node device to perform P2P communications with the node devices of the second distribution group to retrieve at least a portion of one or more files (e.g., bundle 432 or release bundle 682, or any one or more files).

At 908, method 900 further includes sending, by the first node device, a download request message (e.g., the download request 686) corresponding to the one or more files to the second node device, one or more other node devices of the second distribution group, or a combination thereof. The download request message includes the token.

In some aspects, techniques for managing software distribution across a hierarchical network may include additional aspects, such as any single aspect or any combination of aspects described below or in connection with one or more other processes or devices described elsewhere herein. In some aspects, a system may be configured to manage software distribution across a hierarchical network. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the at least one processor. The at least one processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, a method for managing software distribution across a hierarchical network includes assigning, by a device corresponding to a top tier of the hierarchical network, a first plurality of node devices to a first set of one or more distribution groups corresponding to a first tier of the hierarchical network that is below the top tier. Each of the first plurality of node devices is assigned to one of the first set of distribution groups. The device also assigns a second plurality of node devices to a second set of one or more distribution groups corresponding to a second tier of the hierarchical network that is below the first tier. Each of the second plurality of node devices is assigned to one of the second set of distribution groups. A first distribution group of the first set of distribution groups is configured as a parent group of the second set of distribution groups. The device maintains topology information indicating assignments of node devices to groups within the hierarchical network. The device further sends one or more files to the first set of distribution groups for at least partial peer-to-peer (P2P) distribution within the first set of distribution groups.

In a second aspect, in combination with the first aspect, the device receives, from one of the node devices of the first distribution group, a registration request message corresponding to an additional node device. The registration request message indicates the additional node device is capable of communication with a second distribution group of the second set of distribution groups and a third distribution group that is configured as a child of the second distribution group. The device also assigns the additional node device to the third distribution group based on the registration request message, and the device updates the topology information to include the assignment of the additional node device to the hierarchical network.

In a third aspect, in combination with the second aspect, after receiving the registration request message, the device verifies an identity of the additional node device based on identification information included in the registration request message. The device also sends, to the first distribution group, a public key, a private key, a token corresponding to authorization for the additional node device to perform P2P communication, or a combination thereof.

In a fourth aspect, in combination with the third aspect, prior to sending the token, the device determines whether to allow the additional node device to receive the one or more files based on permission data corresponding to the additional node device. The device also configures the token to enable receipt of the one or more files based on a determination that the additional node device is permitted to receive the one or more files.

In a fifth aspect, in combination with one or more of the first through fourth aspects, the device receives a request to distribute the one or more files within the hierarchical network. The device also identifies targets of the one or more files based on distribution information included in the request. The device also determines a set of one or more intermediate distribution groups located between the device and the targets in the hierarchical network based on the topology information.

In a sixth aspect, in combination with one or more of the first through fifth aspects, the device generates a release bundle including the one or more files and release bundle metadata. The device (e.g., a distribution service supported by the device) also attaches a signature to the release bundle to generate a signed release bundle. Sending the one or more files to the first set of distribution groups includes sending the signed release bundle to the first set of distribution groups.

In a seventh aspect, in combination with the sixth aspect, generating the release bundle metadata includes generating one or more checksums. The one or more checksums include a checksum for each file of the one or more files, a checksum for an entirety of the one or more files, or a combination thereof.

In an eighth aspect, in combination with the seventh aspect, the device receives a validation response from the first distribution group. The validation response indicates whether receipt of the release bundle at one or more node devices the first distribution group is successful based on the one or more checksums. The device also resends the release bundle to the first distribution group based on the validation response indicating the receipt of the release bundle is unsuccessful.

In a ninth aspect, in combination with one or more of the first through eighth aspects, the device includes a server, an edge device, or a tracker.

In a tenth aspect, in combination with one or more of the first through ninth aspects, node devices of each distribution group are configured to perform P2P communications with other node devices of a respective distribution group to share at least a portion of the one or more files with one or more other node devices of the respective distribution group.

In an eleventh aspect, in combination with one or more of the first through tenth aspects, each distribution group within the hierarchical network is configured to operate as a least recently used (LRU) cache for the one or more files for one or more distribution groups or client device groups assigned as descendants of the distribution group within the hierarchical network.

In a twelfth aspect, in combination with one or more of the first through eleventh aspects, the device assigns an additional node device to one of the first set of distribution groups, updates the topology information based on assignment of the additional node device, and sends the topology information to the first set of distribution groups.

In a thirteenth aspect, in combination with one or more of the first through twelfth aspects, the device receives a health report from a node device of the first distribution group. The health report indicates that an additional node device has been added to one of the second set of distribution groups. The device also updates the topology information based on addition of the additional node device.

In a fourteenth aspect, in combination with one or more of the first through thirteenth aspects, at least one file of the one or more files corresponds to an executable file package, and the one or more files are included in a release bundle that includes resource assignment information corresponding to the executable file package, interdependencies associated with the at least one file, or both.

In a fifteenth aspect, in combination with the fourteenth aspect, the executable file package includes a Docker container.

In a sixteenth aspect, managing software distribution across a hierarchical network includes a first node device sending a registration request message to a second node device of a first distribution group of the hierarchical network. The registration request message indicates a request for the first node device to join the hierarchical network. The first node device receives a registration response message from the second node device. The registration response message indicates an assignment of the first node device to a second distribution group corresponding to a lower tier of the hierarchical network that is below a tier that includes the first distribution group. The registration response message further indicates node devices included in the first distribution group, node devices included in the second distribution group, or both. The first node device receives a token from the second node device. The token corresponds to authorization for the first node device to perform P2P communications with the node devices of the second distribution group to retrieve at least a portion of one or more files. The first node device also sends a download request message corresponding to the one or more files to the second node device, one or more other node devices of the second distribution group, or a combination thereof. The download request message includes the token.

In a seventeenth aspect, in combination with the sixteenth aspect, the first node device receives the one or more files from one or more node devices of the first distribution group, the one or more node devices of the second distribution group, or a combination thereof.

In an eighteenth aspect, in combination with the sixteenth aspect or the seventeenth aspect, the token is received based on the first node device being associated with permission to receive the one or more files.

In a nineteenth aspect, in combination with one or more of the sixteenth through eighteenth aspects, the first node device determines whether the token is valid, and based on a determination that the token is expired, sends a request to renew the token to the second node device.

In a twentieth aspect, in combination with one or more of the sixteenth through nineteenth aspects, the first node device receives a public key, a private key, or both, of the hierarchical network from the second node device and receives a network-signed certificate from the second node device. The network-signed certificate is configured to enable P2P communications between the first node device and other devices of the hierarchical network.

In a twenty-first aspect, in combination with one or more of the sixteenth through twentieth aspects, the first node device applies a digital signature to a certificate to create a signed certificate, sends the signed certificate to the second node device, and receives a network-signed version of the signed certificate from the second node device. The network-signed version of the signed certificate is configured to enable P2P communications between the first node device and other devices of the hierarchical network.

In a twenty-second aspect, in combination with one or more of the sixteenth through twenty-first aspects, the first node device sends a signed certificate to the second node device. The signed certificate is based on a digital signature of a trusted external verification service. The first node device also receives a network-signed version of the signed certificate from the second node device. The network-signed version of the signed certificate is configured to enable P2P communications between the first node device and other devices of the hierarchical network.

In a twenty-third aspect, in combination with one or more of the sixteenth through twenty-second aspects, the registration response message further indicates node devices included in one or more distribution groups corresponding to one or more higher tiers of the hierarchical network that are above the tier that includes the first distribution group and a device corresponding to a top tier of the hierarchical network.

In a twenty-fourth aspect, in combination with one or more of the sixteenth through twenty-third aspects, the first node device receives a release bundle from the second node device, the one or more other node devices of the second distribution group, or a combination thereof. The release bundle includes the one or more files of a software release and release bundle metadata. The first node device also receives a plurality of checksums from the second node device. The plurality of checksums correspond to multiple portions of the one or more files. The first node device further verifies whether each of the multiple portions of the one or more files are received based on the plurality of checksums.

In a twenty-fifth aspect, in combination with the twenty-fourth aspect, the first node device sends a validation response to the second node device. The validation response indicates validation, based on the plurality of checksums, of receipt of at least one of the multiple portions of the one or more files.

In a twenty-sixth aspect, in combination with one or more of the sixteenth through twenty-fifth aspects, the first node device receives a release bundle from the second node device, the one or more other node devices of the second distribution group, or a combination thereof. The release bundle includes the one or more files of a software release and release bundle metadata. The first node device also receives a checksum from the second node device. The checksum corresponds to an entirety of the one or more files. The first node device further verifies whether the one or more files are received based on the checksum.

In a twenty-seventh aspect, in combination with one or more of the sixteenth through twenty-sixth aspects, the first node device receives updated topology information from the second node device. The updated topology information indicates changes to the first distribution group, the second distribution group, one or more distribution groups corresponding to tiers in the hierarchical network above the tier that includes the first distribution group, or a combination thereof.

In a twenty-eighth aspect, in combination with one or more of the sixteenth through twenty-seventh aspects, the hierarchical network includes a private network of an enterprise.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the scope of the present disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for managing software distribution across a network, the method comprising:
   assigning, by a device, a first plurality of node devices to a first set of one or more distribution groups corresponding to a first level of the network;
   assigning, by the device, a second plurality of node devices to a second set of one or more distribution groups corresponding to a second level of the network, where a first distribution group of the first set of distribution groups is configured as a parent group of the second set of distribution groups;
   maintaining, by the device, topology information indicating assignments of node devices to groups within the network; and
   sending, by the device, one or more files to the first set of distribution groups for distribution within the first set of distribution groups.

2. The method of claim 1, further comprising:
receiving, by the device from one of the node devices of the first distribution group, a registration request message corresponding to an additional node device, the registration request message indicating the additional node device is capable of communication with a second distribution group of the second set of distribution groups and a third distribution group that is configured as a child of the second distribution group;
assigning, by the device, the additional node device to the third distribution group based on the registration request message; and
updating, by the device, the topology information to include the assignment of the additional node device to the network.

3. The method of claim 2, further comprising, after receiving the registration request message:
verifying, by the device, an identity of the additional node device based on identification information included in the registration request message; and
sending, by the device to the first distribution group, authorization information corresponding to authorization for the additional node device to perform communication.

4. The method of claim 1, further comprising:
receiving, by the device, a request to distribute the one or more files within the network;
identifying, by the device, targets of the one or more files based on distribution information included in the request; and
determining, by the device, a set of one or more intermediate distribution groups located between the device and the targets in the network based on the topology information.

5. The method of claim 1, further comprising:
generating, by the device, a release bundle comprising the one or more files and metadata; and
sending the release bundle to the first set of distribution groups.

6. The method of claim 5, wherein generating the metadata comprises generating one or more checksums.

7. The method of claim 6, further comprising:
receiving, by the device, a validation response from the first distribution group, the validation response indicating whether receipt of the release bundle at one or more node devices of the first distribution group is successful based on the one or more checksums; and
resending, by the device, the release bundle to the first distribution group based on the validation response indicating the receipt of the release bundle is unsuccessful.

8. A system for managing software distribution across a network, the system comprising:
at least one memory storing instructions; and
one or more processors coupled to the at least one memory, the one or more processors configured to execute the instructions to cause the one or more processors to:
assign a first plurality of node devices to a first set of one or more distribution groups corresponding to a first level of the network;
assign a second plurality of node devices to a second set of one or more distribution groups corresponding to a second level of the network, where a first distribution group of the first set of distribution groups is configured as a parent group of the second set of distribution groups;
maintain topology information indicating assignments of node devices to groups within the network; and
send one or more files to the first set of distribution groups for distribution within the first set of distribution groups.

9. The system of claim 8, where the one or more processors are further configured to:
assign an additional node device to one of the first set of distribution groups;
update the topology information based on assignment of the additional node device; and
send the topology information to the first set of distribution groups.

10. The system of claim 8, where the one or more processors are further configured to:
receive a report from a node device of the first distribution group, the report indicating that an additional node device has been added to one of the second set of distribution groups; and
update the topology information based on addition of the additional node device.

11. The system of claim 8, where:
at least one file of the one or more files corresponds to an executable file; and
the one or more files are included in a release bundle that includes resource assignment information corresponding to the executable file, interdependencies associated with the at least one file, or both.

12. The system of claim 8, where the one or more processors are further configured to:
generate a release bundle comprising the one or more files and metadata; and
send the release bundle to the first set of distribution groups.

13. The system of claim 12, where the metadata comprises one or more checksums.

14. The system of claim 13, where the one or more processors are further configured to:
receive a validation response from the first distribution group, the validation response indicating whether receipt of the release bundle at one or more node devices of the first distribution group is successful based on the one or more checksums; and
resend the release bundle to the first distribution group based on the validation response indicating the receipt of the release bundle is unsuccessful.

15. A method for managing software distribution across a network, the method comprising:
sending, by a first node device, a registration request message to a second node device of a first distribution group of the network, the registration request message indicating a request for the first node device to join the network;
receiving, by the first node device, a registration response message from the second node device, the registration response message indicating an assignment of the first node device to a second distribution group corresponding to a level of the network that is below a level that includes the first distribution group, the registration response message further indicating node devices included in the first distribution group, node devices included in the second distribution group, or both;
receiving, by the first node device, authorization from the second node device for the first node device to perform communications with the node devices of the second distribution group to retrieve at least a portion of one or more files; and sending, by the first node device, a download request message corresponding to the one or more files to the second node device, one or more other node devices of the second distribution group, or a combination thereof.

16. The method of claim 15, further comprising:
receiving, by the first node device, the one or more files from one or more node devices of the first distribution group, the one or more other node devices of the second distribution group, or a combination thereof.

17. The method of claim 15, further comprising:
applying, by the first node device, a digital signature to a certificate to create a signed certificate;
sending, by the first node device, the signed certificate to the second node device; and
receiving, by the first node device, a network-signed version of the signed certificate from the second node device, the network-signed version of the signed certificate configured to enable communications between the first node device and other devices of the network.

18. The method of claim 15, where the authorization is received based on the first node device being associated with permission to receive the one or more files.

19. The method of claim 15, further comprising:
receiving, by the first node device, a public key, a private key, or both, of the network from the second node device; and
receiving, by the first node device, a network-signed certificate from the second node device, the network-signed certificate configured to enable communications between the first node device and other devices of the network.

20. The method of claim 15, where the registration response message further indicates node devices included in one or more distribution groups corresponding to one or more higher levels of the network that are above the level that includes the first distribution group and a device corresponding to a top level of the network.

* * * * *